United States Patent [19]

Hioki

[11] Patent Number: 5,459,025
[45] Date of Patent: Oct. 17, 1995

[54] METHINE COMPOUND AND SILVER HALIDE PHOTOGRAPHIC MATERIAL COMPRISING SAME

[75] Inventor: Takanori Hioki, Kanagawa, Japan

[73] Assignee: Fuji Photo Film Co., Ltd., Kanagawa, Japan

[21] Appl. No.: 309,672

[22] Filed: Sep. 21, 1994

[30] Foreign Application Priority Data

Sep. 21, 1993 [JP] Japan .................................. 5-235141

[51] Int. Cl.$^6$ ................................................ G03C 1/12
[52] U.S. Cl. ........................ 430/570; 430/581; 430/583; 430/584; 430/588; 430/592; 430/595
[58] Field of Search ............................. 430/570, 581, 430/583, 584, 588, 592, 595, 598

[56] References Cited

U.S. PATENT DOCUMENTS

| | | | |
|---|---|---|---|
| 3,679,427 | 7/1972 | Lincoln et al. | 96/120 |
| 4,800,154 | 1/1989 | Okazaki et al. | 430/570 |
| 4,971,889 | 11/1990 | Ikeda et al. | 430/570 |
| 5,190,853 | 3/1993 | Seto et al. | 430/598 |
| 5,340,694 | 8/1994 | Hioki et al. | 430/598 |

FOREIGN PATENT DOCUMENTS

| | | | |
|---|---|---|---|
| 267542 | 3/1990 | Japan | G03C 1/14 |
| 267541 | 3/1990 | Japan | G03C 1/14 |
| 5216152 | 8/1993 | Japan | G03C 1/12 |

OTHER PUBLICATIONS

"The Theory of the Photographic Process" pp. 265–268 & pp. 259–265, Macmillan, 1966.
"Journal of the Physical Chemistry" vol. 94, 1990.

Derwart Abstracts of JP-A-2-67541 and JP-A-2-67542.

*Primary Examiner*—Janet C. Baxter
*Attorney, Agent, or Firm*—Sughrue, Mion, Zinn, Macpeak & Seas

[57] ABSTRACT

A novel silver halide photographic material is provided, comprising at least one methine compound having a methine dye and hydrazine covalently bonded to each other, two nitrogen atoms in said hydrazine being substituted by four substituents. In a preferred embodiment, the methine compound is represented by formula (I):

$$(MET)_{k_1}\text{-}(Q)_{k_2}\text{-}Hy)_{k_3} \quad (I)$$

wherein MET represents an atomic group; Q represents a divalent bonding group consisting of atoms or atomic group containing at least one of carbon atom, nitrogen atom, sulfur atom and oxygen atom; Hy represents an atomic group having a hydrazine structure represented by formula (II); $k_1$ represents 0 or an integer 1 to 4; and $k_2$ represents 0 or 1, and $k_3$ represents an integer 1 to 4.

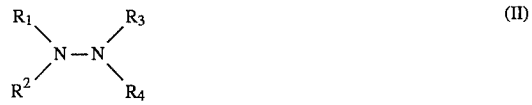

wherein $R_1$, $R_2$, $R_3$ and $R_4$ each represents an alkyl group, an aryl group or a heterocyclic group, with the proviso that Hy is substituted by at least one $-(Q)_{k_2}\text{-}(MET)_{k_1}$. A novel methine compound is also provided represented by the general formula (I).

7 Claims, No Drawings

METHINE COMPOUND AND SILVER HALIDE PHOTOGRAPHIC MATERIAL COMPRISING SAME

FIELD OF THE INVENTION

The present invention relates to a silver halide photographic material having a high sensitivity and an excellent storage stability, and a novel methine compound to improve such properties thereof.

BACKGROUND OF THE INVENTION

Heretofore, it has been desired to provide silver halide photographic materials with a higher sensitivity. In particular, it has been keenly desired to provide spectrally sensitized silver halide photographic materials with a higher sensitivity.

A spectral sensitizing technique is an extremely important and indispensable technique in the preparation of a light-sensitive material which exhibits a high sensitivity and an excellent color reproducibility. A spectral sensitizer inherently has an effect for absorbing light in the long wavelength range that is not substantially absorbed by a silver halide photographic emulsion and transferring its light energy to the silver halide. Thus, the rise in the amount of light captured by the spectral sensitizer is favorable for enhancing photographic sensitivity. Accordingly, attempts to enhance the captured amount of light have been made by increasing the amount of a spectral sensitizer to be added to the silver halide emulsion. However, if the amount of the spectral sensitizer to be added to the silver halide emulsion exceeds its optimum value, it causes a great desensitization. This is a phenomenon normally called dye desensitization which occurs in the inherent sensitive wavelength range of silver halides where there is no light absorption by sensitizing dyes. When a great desensitization occurs, it gives a reduced overall sensitivity, regardless of the spectral sensitizing effect. In other words, the less dye desensitization is, the more is the sensitivity in the wavelength range of light absorption by the sensitizing dye (i.e., spectral sensitization). Accordingly, the reduction of dye desensitization is an important assignment in the spectral sensitizing technique. The longer the sensitive wavelength range of sensitizing dye is, the more is dye desensitization. This phenomenon is clearly described in T. H. James, "The Theory of the Photographic Process", pp. 265–268, Macmillan, 1966.

As described in Tadaaki Tani, "Journal of the Physical Chemistry", vol. 94, page 1,298, 1990, it has been known that sensitizing dyes having a reduction potential of higher than −1.25 V show a low relative quantum yield of spectral sensitization. In order to enhance the relative quantum yield of spectral sensitization of such dyes, it has been proposed to effect supersensitization by capturing positive holes as described in the above cited "The Theory of the Photographic Process", pp. 259–265, 1966.

As the foregoing supersensitizer for eliminating desensitization there may be used a compound having a lower oxidation potential than sensitizing dyes. For example, JP-A-5-216152 (EP 0 554 856 A1, U.S. Ser. No. 08/012,350) discloses a hydrazine compound (The term "JP-A" as used herein means an "unexamined published Japanese patent application"). However, it cannot be said that this hydrazine compound has a thorough effect of providing a higher sensitivity. Further, U.S. Pat. No. 3,679,427, JP-A-2-67541, and JP-A-2-67542 disclose a dye having a hydrazine structure moiety different from that of the present invention. However, this dye is disadvantageous in that it largely increases a fog.

SUMMARY OF THE INVENTION

An object of the present invention is to provide a silver halide photographic material having a high sensitivity.

Another object of the present invention is to provide a silver halide photographic material having a high storage stability.

A further object of the present invention is to provide a novel methine compound.

These and other objects of the present invention will become more apparent from the following detailed description and examples.

The foregoing objects of the present invention are accomplished with a silver halide photographic material, containing at least one methine compound having a methine dye and hydrazine covalently bonded to each other, two nitrogen atoms in said hydrazine being substituted by four substituents. The foregoing methine compound is preferably represented by following formula (I):

wherein MET represents an atomic group having a methine dye structure; Q represents a divalent bonding group consisting of atoms or atomic group containing at least one of carbon atom, nitrogen atom, sulfur atom and oxygen atom; Hy represents an atomic group having a hydrazine structure represented by following formula (II); $k_1$ and represents 0 or an integer 1 to 4; $k_2$ represents 0 or 1 and $k_3$ represents an integer 1 to 4:

wherein $R_1$, $R_2$, $R_3$ and $R_4$ each represents an alkyl group, an aryl group or a heterocyclic group, with the proviso that Hy is substituted by at least one $-(Q)_{k2}-(MET)_{k1}$.

DETAILED DESCRIPTION OF THE INVENTION

The present invention will be further described hereinafter.

In the formula (I), the group represented by MET represents a cyanine structure having a nitrogen-containing heterocyclic group called a basic nulceus and another nitrogen-containing heterocyclic group connected to each other by a conjugated double bond so that may be conjugated to each other, a melocyanine structure having a heterocyclic group called an acidic nucleus and a basic nucleus connected to each other a conjugated double bond such that a carbonyl group in the acidic nucleus and a nitrogen atom in the basic nucleus are conjugated to each other, or a rhodacyanine structure, oxonol structure, hemicyanine structure, styryl structure or benzylidene structure having these structures in combination.

Examples of such a polymethine dye are described in T. H. James, "The Theory of the Photographic Process", 1977, Macmillan, Chapter 8, F. M. Hamer, "Heterocyclic Compounds—Cyanine Dyes and Related Compounds", John Wiley & Sons, New York, London, 1964, D. M. Sturmer, "Heterocyclic Compounds-Special topics in heterocyclic chemistry", chapter 18, Section 14, pp. 482–515, John Wiley & Sons, New York, London, 1977, "Rodd's Chemistry of Carbon Compounds", 2nd. Ed., vol. IV, part B, 1977, chapter 15, pp. 369–422, 2nd. Ed., vol. IV, part B, 1985, chapter 15, pp. 267–296, Elsevier Science Publishing Company Inc., New York, etc.

For details of the hydrazine structure represented by Hy, reference can be made to JP-A-5-216152.

Q represents a divalent bonding group consisting of atoms or atomic group containing at least one atom selected from a carbon atom, a nitrogen atom, a sulfur atom and an oxygen atom.

Preferably, Q represents an alkylene group (e.g., methylene, ethylene, propylene, butylene, pentylene), an arylene group (e.g., phenylene, naphthylene), an alkenylene group (e.g., ethenylene, propenylene), an amide group, an ester group, a sulfoamide group, a sulfonic ester group, an ureide group, a sulfonyl group, a sulfinyl group, a thioether group, an ether group, a carbonyl group, —N($R^1$)— (in which $R^1$ represents a hydrogen atom or substituted or unsubstituted alkyl or aryl group) or a divalent bonding group having 1 to 20 carbon atoms comprising one or more of divalent heterocyclic groups (e.g., 6-chloro-1,3,5-triazine-2,4-diil,pyrimidine-2,4-diil, quinoxaline-2,3-diil) in combination. Further preferred among these groups are an ester group and an amide group.

Suffix $k_1$ is preferably 1 or 2. Suffix $k_3$ is preferably 1, 2, 3 or 4. More preferably, $k_1$, $k_2$ or $k_3$ is 1.

In the present invention, the cyanine structure which can be preferably used as MET is represented by formula (III). The melocyanine structure which can be preferably used as MET is represented by formula (IV). The rhodacyanine structure which can be preferably used as MET is represented by formula (V). The allopolar dye structure which can be preferably used as MET is represented by formula (VI).

In these formulae, $Z_{11}$, $Z_{12}$, $Z_{13}$, $Z_{14}$, $Z_{15}$, $Z_{16}$, $Z_{17}$ and $Z_{18}$ each represents an atomic group necessary for the formation of a 5- or 6-membered nitrogen-containing heterocyclic group.

D and $D_a$, and $D_1$ and $D_{1a}$ each represents an atomic group necessary for the formation of a noncyclic or cyclic acid nucleus.

$R_{11}$, $R_{12}$, $R_{13}$, $R_{14}$, $R_{16}$, $R_{17}$ and $R_{18}$ each represents an alkyl group.

$R_{15}$ represents an alkyl group, an aryl group or a heterocyclic group.

$L_{11}$, $L_{12}$, $L_{13}$, $L_{14}$, $L_{15}$, $L_{16}$, $L_{17}$, $L_{18}$, $L_{19}$, $L_{20}$, $L_{21}$, $L_{22}$, $L_{23}$, $L_{24}$, $L_{25}$, $L_{26}$, $L_{27}$, $L_{29}$, $L_{30}$, $L_{31}$, $L_{32}$, $L_{33}$, $L_{34}$, $L_{35}$, $L_{36}$, $L_{37}$ and $L_{38}$ each represent a methine group.

$M_{11}$, $M_{12}$, $M_{13}$ and $M_{14}$ each represents a charge neutralizing paired ion, and $m_{11}$, $m_{12}$, $m_{13}$ and $m_{14}$ each represents a number of 0 or more necessary for the neutralization of electric charge in the molecule.

Suffixes $n_{11}$, $n_{13}$, $n_{14}$, $n_{16}$, $n_{19}$, $n_{20}$, $n_{21}$ and $n_{22}$ each represents 0 or 1.

Suffixes $n_{12}$, $n_{15}$, $n_{17}$ and $n_{18}$ each represents 0 or a positive integer.

More preferably, Q is a dye structure represented by the formula (III) or (VI). Particularly preferred among these dye structures is represented by the formula (VI). Provided that the dye structures is represented by the formulae (III), (IV), (V) and (VI) each is substituted by at least one —(Q)$_{k2}$-(Hy).

The formulae (III), (IV), (V) and (VI) will be further described hereinafter.

Preferably, $R_{11}$, $R_{12}$, $R_{13}$, $R_{14}$, $R_{16}$, $R_{17}$ and $R_{18}$ each is an unsubstituted alkyl group having 1 to 18 carbon atoms (e.g., methyl, ethyl, propyl, butyl, pentyl, octyl, decyl, dodecyl, octadecyl) or a substituted alkyl group. Examples of substituents on such a substituted alkyl group include a carboxyl group, a sulfo group, a cyano group, a halogen atom (e.g., fluorine, chlorine, bromine), a hydroxyl group, an alkoxy-

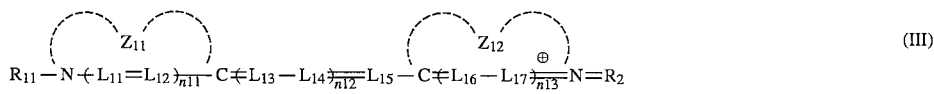 (III)

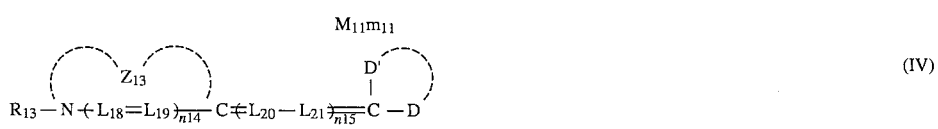 (IV)

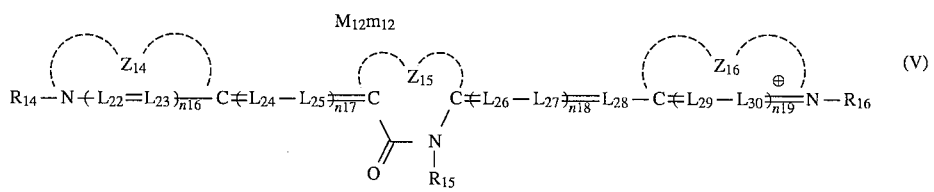 (V)

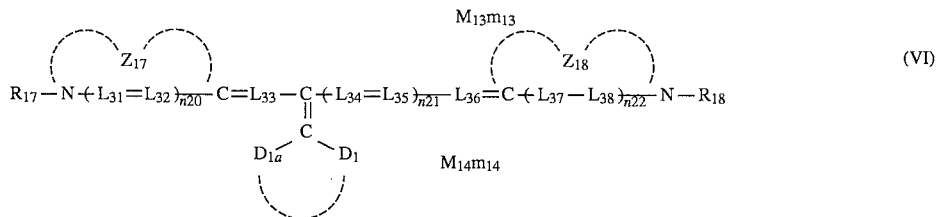 (VI)

carbonyl group having 2 to 8 carbon atoms (e.g., methoxycarbonyl, ethoxycarbonyl, phenoxycarbonyl, benzyloxycarbonyl), an alkoxy group having 1 to 8 carbon atoms (e.g., methoxy, ethoxy, benzyloxy, phenethyloxy), a monocyclic aryloxy group having 6 to 10 carbon atoms (e.g., phenoxy, p-tollyloxy), an acyloxy group having 1 to 3 carbon atoms (e.g., acetyloxy, propionyloxy), an acyl group having 1 to 8 carbon atoms (e.g., acetyl, propionyl, benzoyl, mesyl), a carbamoyl group (e.g., carbamoyl, N,N-dimethylcarbamoyl, morpholinocarbonyl, piperidinocarbonyl), a sulfamoyl group having 0 to 10 carbon atoms (e.g., sulfamoyl, N,N-dimethylsulfamoyl, morpholinosulfonyl, piperidinosulfonyl), and an aryl group having 6 to 10 carbon atoms (e.g., phenyl, 4-chlorophenyl, 4-methylphenyl, α-naphthyl). More preferably, $R_{11}$, $R_{12}$, $R_{13}$, $R_{14}$, $R_{16}$, $R_{17}$ and $R_{18}$ each is an unsubstituted alkyl group (e.g., methyl, ethyl, n-propyl, n-butyl, n-pentyl, n-hexyl), a carboxyalkyl group (e.g., 2-carboxyethyl, carboxymethyl), a sulfoalkyl group (e.g., 2-sulfoethyl, 3-sulfopropyl, 4-sulfobutyl, 3-sulfobutyl) or a methanesulfonylcarbamoylmethyl group.

$M_{11}m_{11}$, $M_{12}m_{12}$, $M_{13}m_{13}$ and $M_{14}m_{14}$ are contained in the formulae to indicate the presence or absence of cation or anion when required to neutralize ionic charge of dye. Whether a dye may be a cation, anion, or may have or may not have a net ionic charge, depends on its auxochromes and substituents. Typical examples of cation include inorganic or organic ammonium ions (e.g., ammonium ion, tetraalkylammonium ion, pyridinium ion), alkaline metal ions (e.g., sodium ion, potassium ion), and alkaline earth metal ions (e.g., calcium ion). On the other hand, the anion may be either inorganic or organic anions. Specific examples of such anions include halogen anions (e.g., fluorine ion, chlorine ion, bromine ion, iodine ion), substituted arylsuylfonate ions (e.g., p-toluenesulfonate ion, p-chlorobenzenesulfonate ion), aryldisulfonate ions (e.g., 1,3-benzenedisulfonate ion, 1,5-naphthalenedisulfonate ion, 2,6-naphthalenedisulfonate ion), alkylsulfate ions (e.g., methylsulfate ion, ethylsulfate ion), sulfate ions, thiocyanate ions, perchlorate ions, tetrafluoroborate ions, picrate ions, acetate ions, and trifluoromethanesulfonate ions.

As the charge neutralizing paired ion there may be used an ionic polymer or other dye having electric charge opposite the dye. Further, a metal complex ion (e.g., bisbenzene-1,2-dithiorate nickel (III)) can be used.

Preferred among the foregoing ions are ammonium ions, iodine ions, and p-toluenesulfonate ions.

The suffixes $m_{11}$, $m_{12}$, $m_{13}$ and $m_{14}$ each is preferably 0 or an integer of 1 to 4, more preferably 0, 1 or 2.

Examples of the nucleus formed by $Z_{11}$, $Z_{12}$, $Z_{13}$, $Z_{14}$, $Z_{16}$, $Z_{17}$ and $Z_{18}$ include a thiazole nucleus such as a thiazole nucleus (e.g., thiazole, 4-methylthiazole, 4-phenylthiazole, 4,5-dimethylthiazole, 4,5-diphenylthiazole), a benzothiazole nucleus (e.g., benzothiazole, 4-chlorobenzothiazole, 5-chlorobenzothiazole, 6-chlorobenzothiazole, 5-nitrobenzothiazole, 4-methylbenzothiazole, 5-methylthiobenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 6-methylbenzothiazole, 5-ethoxybenzothiazole, 5-ethoxycarbonylbenzothiazole, 5-carboxybenzothiazole, 5-phenethylbenzothiazole, 5-fluorobenzothiazole, 5-chloro-6-methylbenzothiazole, 5,6-dimethylbenzothiazole, 5,6-dimethoxybenzothiazole, 5-hydroxy-6-methylbenzothiazole, tetrahydrobenzothiazole, 4-phenylbenzothiazole), and a naphthothiazole nucleus (e.g., naphtho [2,1-d]thiazole, naphtho[1,2-d]thiazole, naphtho[2,3-d]thiazole, 5-methoxynaphtho[1,2-d]thiazole, 7-ethoxynaphtho[2,1-d]thiazole, 8-methoxynaphtho[2,1-d]thiazole, 5-methoxynaphtho[2,3d]thiazole); a thiazoline nucleus (e.g., thiazoline, 4-methylthiazoline, 4-nitrothiazoline); an oxazole nucleus such as an oxazole nucleus (e.g., oxazole, 4-methyloxazole, 4-nitrooxazole, 5-methyloxazole, 4-phenyloxazole, 4,5-diphenyloxazole, 4-ethyloxazole), a benzooxazole nucleus (e.g., benzooxazole, 5-chlorobenzooxazole, 5-methylbenzooxazole, 5-bromobenzooxazole, 5-fluorobenzooxazole, 5-phenylbenzooxazole, 5-methoxybenzooxazole, 5-nitrobenzooxazole, 5-trifluoromethylbenzooxazole, 5-hydroxybenzooxazole, 5-carboxybenzooxazole, 6-methylbenzooxazole, 6-chlorobenzooxazole, 6-nitrobenzooxazole, 6-methoxybenzooxazole, 6-hydroxybenzooxazole, 5,6-dimethylbenzooxazole, 4,6-dimethylbenzooxazole), and a naphthooxazole nucleus (e.g., naphtho[2,1-d]oxazole, naphtho[1,2-d]oxazole, naphtho[2,3d]oxazole, 5-nitronaphtho[2,1-d]oxazole); oxazoline nucleus (e.g., 4,4-dimethyloxazoline); a selenazole nucleus such as selenazole nucleus (e.g., 4-methylselenazole, 4-nitroselenazole, 4-phenylselenazole), a benzoselenazole nucleus (e.g., benzoselanzole, 5-chlorobenzoselenazole, 5-nitrobenzoselenazole, 5-methoxybenzoselenazole, 5-hydroxybenzoselenazole, 6-nitrobenzoselenazole, 5-chloro-6-nitrobenzoselenazole, 5,6-dimethylbenzoselenazole), a naphthoselenazole nucleus (e.g., naphtho[2,1-d]selenazole, naphtho[1,2-d]selenazole); a selenazoline nucleus (e.g., selenazoline, 4-methylselenazoline); a tellurazole nucleus such as tellurazole nucleus (e.g., tellurazole, 4-methyltellurazole, 4-phenyltellurazole), a benzotellurazole nucleus (e.g., benzotellurazole, 5-chlorobenzotellurazole, 5-methylbenzotellurazole, 5,6-dimethylbenzotellurazole, 6-methoxybenzotellurazole), and a naphthotellurazole nucleus (e.g., naphtho[2,1-d]tellurazole, naphtho[1,2-d]tellurazole); a tellurazoline nucleus (e.g., tellurazoline, 4-methyltellurazoline), 3,3-dialkylindolenine nucleus (e.g., 3,3-dimethylindolenine, 3,3-diethylindolenine, 3,3-dimethyl-5-cyanoindolenine, 3,3-dimethyl-6-nitroindolenine, 3,3-dimethyl-5-nitroindolenine, 3,3-dimethyl-5-methoxyindolenine, 3,3,5-trimethylindolenine, 3,3-dimethyl-5-chloroindolenine); an imidazole nucleus such as an imidazole nucleus (e.g., 1-alkylimidazole, 1-alkyl-4-phenylimidazole, 1-arylimidazole), benzoimidazole nucleus (e.g., 1-alkylbenzoimidazole, 1-alkyl-5-chlorobenzoimidazole, 1-alkyl-5,6-dichlorobenzoimidazole, 1-alkyl-5-methoxybenzoimidazole, 1-alkyl-5-cyanobenzoimidazole, 1-alkyl-5-fluorobenzoimidazole, 1-alkyl-5-trifluoromethylbenzoimidazole, 1-alkyl-6-chloro-5-cyanobenzoimidazole, 1-alkyl-6-chloro-5-trifluoromethylbenzoimidazole, 1-allyl-5,6-dichlorobenzoimidazole, 1-allyl-5-chlorobenzoimidazole, 1-arylbenzoimidazole, 1-aryl-5-chlorobenzoimidazole, 1-aryl-5,6-dichlorobenzoimidazole, 1-aryl-5-methoxybenzoimidazole, 1-aryl-5-cyanobenzoimidazole), and a naphthoimidazole nucleus (e.g., alkylnaphtho[1,2-d]imidazole, 1-arylnaphtho[1,2-d]imidazole). The foregoing alkyl group is preferably a $C_{1-8}$ alkyl group. Preferred examples of such an alkyl group include an unsubstituted alkyl group such as methyl, ethyl, propyl, isopropyl and butyl, and a hydroxyalkyl group such as 2-hydroxyethyl and 3-hydroxypropyl. Particularly preferred among these alkyl groups are methyl group and ethyl group. The foregoing aryl group is a phenyl, a halogen ( e.g., chloro)-substituted phenyl, an alkyl ( e.g., methyl)-substituted phenyl or an alkoxy(e.g., methoxy)-substituted phenyl.); a pyridine nucleus ( e.g., 2-pyridine, 4-pyridine, 5-methyl-2-pyridine, 3-methyl-4-pyridine), a quinoline nucleus such as a quinoline nucleus (e.g., 2-quinoline, 3-methyl-2-quinoline, 5-ethyl-2-quinoline, 6-methyl-2-quinoline, 6-nitro-2-quinoline, 8-fluoro-2-quinoline, 6-methoxy-2-quinoline, 6-hydroxy-2-quinoline, 8-chloro-2-quinoline, 4-quinoline, 6-ethoxy-4-quinoline, 6-nitro-4-quinoline, 8-chloro-4-quinoline, 8-fluoro-4-quinoline, 8-methyl-4-quinoline, 8-methoxy-4-quinoline, 6-methyl-4quinoline, 6-methoxy-4-quinoline, 6-chloro-4-quinoline), and an isoquinoline nucleus ( e.g., 6-nitro-1-isoquinoline, 3,4-dihydro-1-isoquinoline, 6-nitro-3-isoquinoline), an imidazo[4,5-b]quinoxaline nucleus (e.g. , 1,3-diethylimidazo[4,5-b]quinoxaline, 6-chloro-1,3-diallylimidazo[4,5-b]quinoxaline), an oxadiazole nucleus, a thiadiazole nucleus, a tetrazole nucleus, and a pyrimidine nucleus.

Preferred examples of the nucleus formed by $Z_{11}$, $Z_{12}$, $Z_{13}$, $Z_{14}$, $Z_{16}$, $Z_{17}$ and $Z_{18}$ include a benzothiazole nucleus, a naphthothiazole nucleus, a benzooxazole nucleus, a naphthooxazole nucleus, a benzoimidazole nucleus, a 2-quinoline nucleus, and a 4-quinoline nucleus. A particularly preferred example of the nucleus formed by $Z_{17}$ and $Z_{18}$ is a naphtho[1,2-d]thiazole nucleus.

D and $D_a$, and $D_1$ and $D_{1a}$ each represents an atomic group necessary for the formation of an acidic nucleus. These atomic groups may be in the form of acidic nucleus of any ordinary melocyanine dye. The term "acidic nucleus" as used herein is as defined in James, "The Theory of the Photographic Process", 4th ed., Macmillan, 1977, page 198. In a preferred form, the substituent that takes part in the resonance of D and $D_1$ is a carbonyl group, a thiocarbonyl group, a cyano group, a sulfonyl group or a sulfenyl group. $D_a$ and $D_{1a}$ each represents the rest of an atomic group necessary for the formation of acidic nucleus.

Specific examples of such an atomic group include those described in U.S. Pat. Nos. 3,567,719, 3,575,869, 3,804,634, 3,837,862, 4,002,480, and 4,925,777, and JP-A-3-167546.

When the acidic nucleus is noncyclic, the methine bond is terminated by a group such as a malononitrile, an alkanesulfonylacetonitrile, a cyanomethylbenzofuranylketone and a cyanomethylphenylketone.

When D and $D_a$, and $D_1$ and $D_{1a}$ are cyclic, they form a 5- or 6-membered heterocyclic group comprising carbon, nitrogen and chalcogen (typically oxygen, sulfur, selenium, tellurium) atoms.

Preferred examples of such an acidic nucleus include 2-pyrazolin-5-one, pyrazolidine-3,5-dione, imidazolin-5-one, hydantoin, 2- or 4-thiohydantoin, 2-iminooxazolidin-4-one, 2-oxazolin-5-one, 2-thiooxazolidine-2,4-dione, isooxazolin-5-one, 2-thiazolin-4-one, thiazolidin-4 -one, thiazolidine-2,4-dione, rhodanine, thiazolidine-2,4-dithione, isorhodanine, indan-1,3-dione, thiophen-3-one-1,1-dioxide, indolin-2-one, indolin-3-one, indazolin-3-one, 2-oxoindazolinium, 3-oxoindazolinium, 5,7-dioxo-6,7-dihydrothiazolo[3,2-a]pyrimidine, cyclohexane-1,3-dione, 3,4-dihydroisoquinolin-4-one, 1,3-dioxane-4,4-dione, barbituric acid, 2-thiobarbituric acid, chroman-2,4-dione, indazolin-2-one, pyrido[1,2-a]pyrimidine-1,3-dione, pyrazolo[1,5-b]quinazolone, pyrazolo[1,5-a]benzoimidazole, pyrazolopyridone, 1,2,3,4-tetrahydroquinoline-2,4-dione, and 3-oxo-2,3-dihydrobenzo[d]thiophen-1,1-dioxide.

Even more Preferred among these acidic nuclei are 3-alkylrhodanine, 3-alkyl-2-thiooxazolidine-2,4-dione, 3-alkyl-2-thiohydantoin, barbituric acid, and 2-thiobarbituric acid. A particularly preferred example of acidic nucleus formed by $D_1$ and $D_{1a}$ is barbituric acid.

Examples of substituents and $R_{15}$ connected to nitrogen atom contained in these acidic nuclei include alkyl group having 1 to 18 carbon atoms (e.g., methyl, ethyl, propyl, isopropyl, butyl, isobutyl, hexyl, octyl, dodecyl, octadecyl), aryl group having 6 to 18 carbon atoms (e.g., phenyl, 2-naphthyl, 1-naphthyl), and heterocyclic group having 1 to 18 carbon atoms (e.g., 2-pyridyl, 2-thiazolyl, 2-furyl). These substituents may be further substituted by other substituents. Examples of such substituents include a carboxyl group, a sulfo group, a cyano group, a nitro group, a halogen atom (e.g., fluorine, chlorine, iodine, bromine), a hydroxyl group, an alkoxy group having 1 to 8 carbon atoms (e.g., methoxy, ethoxy, benzyloxy, phenethyloxy), an aryloxy group having 6 to 15 carbon atoms (e.g., phenoxy), an acyloxy group having 1 to 8 carbon atoms (e.g., acetyloxy), an alkoxycarbonyl group having 2 to 8 carbon atoms, an acyl group having 1 to 8 carbon atoms, a sulfamoyl group having 0 to 8 carbon atoms (e.g., sulfamoyl, N,N-dimethylsulfamoyl), a carbamoyl group having 1 to 8 carbon atoms (e.g., carbamoyl, N,N-dimethylcarbamoyl), alkanesulfonylaminocarbonyl group having 1 to 8 carbon atoms (e.g., methanesulfonylaminocarbonyl), an acylaminosulfonyl group having 1 to 8 carbon atoms (e.g., acetylaminosulfonyl), an aryl group having 6 to 15 carbon atoms (e.g., phenyl, 4-methylphenyl, 4-chlorophenyl, naphthyl), and a heterocyclic group having 1 to 15 carbon atoms (e.g., pyrrolidin-2-on-1-il, tetrahydrofurfuryl, 2-morphonino). These substituents may be further substituted by these substituents.

Even more preferred among these substituents are an unsubstituted alkyl group (e.g., methyl, ethyl, n-propyl, n-butyl, n-pentyl, n-hexyl), a carboxyalkyl group (e.g., carboxymethyl, 2-carboxyethyl), and a sulfoalkyl group (e.g., 2-sulfoethyl).

The 5- or 6-membered nitrogen-containing heterocyclic group formed by $Z_{15}$ is obtained by elimination of oxo group or thioxo group in a proper position from a heterocyclic group represented by D and D', preferably by elimination of thioxo group from a rhodanine nucleus.

$L_{11}$, $L_{12}$, $L_{13}$, $L_{14}$, $L_{15}$, $L_{16}$, $L_{17}$, $L_{18}$, $L_{19}$, $L_{20}$, $L_{21}$, $L_{22}$, $L_{23}$, $L_{24}$, $L_{25}$, $L_{26}$, $L_{27}$, $L_{28}$, $L_{29}$, $L_{30}$, $L_{31}$, $L_{32}$, $L_{33}$, $L_{34}$, $L_{35}$, $L_{36}$, $L_{37}$ and $L_{38}$ each represents a methine group or a substituted methine group. Examples of substituents on such a substituted methine group include substituted or unsubstituted alkyl group (e.g., methyl, ethyl, 2-carboxyethyl), substituted or unsubstituted aryl group (e.g., phenyl, o-carboxyphenyl), a heterocyclic group (e.g., barbituric acid), a halogen atom (e.g., chlorine, bromine), an alkoxy group (e.g., methoxy, ethoxy), an amino group (e.g., N,N-diphenylamino, N-methyl-N-phenylamino, N-methylpiperadino), and an alkylthio group (e.g., methylthio, ethylthio). Such a methine group may form a ring with other methine groups or with auxochromes. $L_{11}$, $L_{12}$, $L_{16}$, $L_{17}$, $L_{18}$, $L_{19}$, $L_{22}$, $L_{23}$, $L_{29}$, $L_{30}$, $L_{31}$, $L_{32}$, $L_{37}$, and $L_{38}$ each is preferably a unsubstituted methine group.

Suffix $n_1$, $n_{15}$, $n_{17}$ and $n_{18}$ each is preferably 0 or an integer of 1 to 5.

Suffix $n_{12}$ is more preferably 0, 1, 2 or 3.

$L_{13}$, $L_{14}$ and $L_{15}$ form a monomethine dye, trimethine dye, pentamethine dye, heptamethine dye or the like. When $n_{12}$ is 2 or more, $L_{13}$ and $L_{14}$ units are repeated but may not be the same.

Preferred examples of $L_{13}$, $L_{14}$ and $L_{15}$ will be given below.

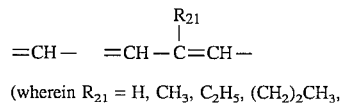

(wherein $R_{21}$ = H, $CH_3$, $C_2H_5$, $(CH_2)_2CH_3$,

-continued

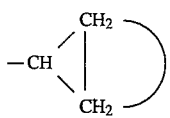

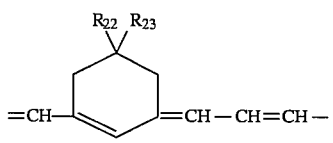

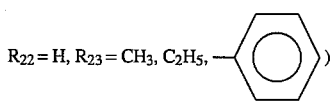

(wherein $R_{22} = R_{23} = CH_3$ $R_{22} = H$, $R_{23} = CH_3$, $C_2H_5$, 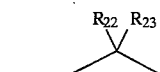 )

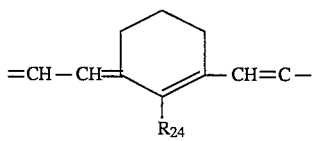

(wherein $R_{24} = H$, $CH_3$, —⌬ )

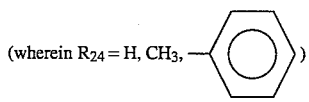

In the above formulae $R_{21}$, $R_{22}$, $R_{23}$, $R_{24}$ each represents hydrogen atom, alkyl group, aryl group, or heterocyclic group. The suffix $n_{12}$ is the most preferably 1.

The suffix $n_{15}$ is more preferably 0, 1, 2 or 3.

$L_{20}$ and $L_{21}$ form a zeromethine, dimethine, tetramethine or hexamethine dye. When $n_{15}$ is 2 or more, $L_{20}$ and $L_{21}$ units are repeated but may not be the same.

Preferred examples of $L_{20}$ and $L_{21}$ will be given below.

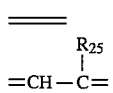

(wherein $R_{25}$ = H, $CH_3$, $C_2H_5$)

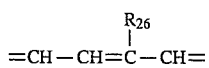

(wherein $R_{26}$ = H, $CH_3$, $CH_2$—⌬ )

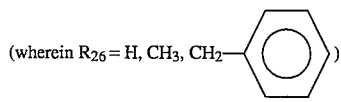

-continued

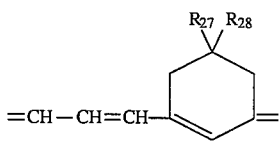

(wherein $R_{27}$, $R_{28}$ = H, $CH_3$, —⌬ )

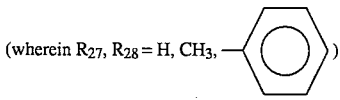

(wherein $R_{29}$ = H, $CH_3$, —⌬ )

In the above formulae, $R_{25}$, $R_{26}$, $R_{27}$, $R_{28}$, $R_{29}$ each represents hydrogen atom, alkyl group, aryl group, or heterocyclic group. Suffix $n_{17}$ is more preferably 0, 1, 2 or 3.

$L_{24}$ and $L_{25}$ form a zeromethine, dimethine, tetramethine or hexamethine dye. When $n_{17}$ is 2 or more, $L_{24}$ and $L_{25}$ units are recurred but may not be the same.

Preferred examples of $L_{24}$ and $L_{25}$ are the same as that of $L_{20}$ and $L_{21}$.

Suffix $n_{18}$ is more preferably 0, 1, 2 or 3.

$L_{26}$, $L_{27}$ and $L_{28}$ form a monomethine, trimethine, pentamethine or heptamethine dye. When $n_{18}$ is 2 or more, $L_{26}$ and $L_{27}$ units are recurred but may not be the same.

Preferred examples of $L_{26}$, $L_{27}$ and $L_{28}$ will be given below.

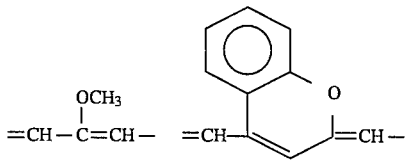

Other preferred examples of $L_{26}$, $L_{27}$ and $L_{28}$ include those given with reference to $L_{13}$, $L_{14}$ and $L_{15}$. The suffix $n_{21}$ is preferably 0. $L_{33}$ and $L_{36}$ each is preferably a unsubstituted methine group.

The methine dye structures represented by the formulae (III), (IV), (V) and (VI) each is substituted by at least one $(Q)_{k2}$-(Hy). The position at which $(Q)_{k2}$-(Hy) substitutes for the methine dye structure may be on any of $Z_{11}$, $Z_{12}$, $Z_{13}$, $Z_{14}$, $Z_{15}$, $Z_{16}$, $Z_{17}$, $Z_{18}$, D, $D_a$, $D_1$, $D_{1a}$, $R_{11}$, $R_{12}$, $R_{13}$, $R_{14}$, $R_{15}$, $R_{16}$, $R_{17}$, $R_{18}$, and $L_1$ to $L_{38}$. Preferably, it is on any of the groups represented by $D_1$, $D_{1a}$, $R_{11}$, $R_{12}$, $R_{13}$, $R_{14}$, $R_{15}$, $R_{16}$, $R_{17}$ and $R_{18}$.

The hydrazine structure represented by the formula (II) which can be preferably used as Hy in the present invention will be further described hereinafter.

In the formula (II), $R_1$, $R_2$, $R_3$ and $R_4$ each represents an alkyl group, an aryl group or a heterocyclic group.

$R_1$ and $R_2$, $R_3$ and $R_4$, $R_1$ and $R_3$, and $R_2$ and $R_4$ may be connected to each other to form a ring but may not form an aromatic ring.

In $R_1$, $R_2$, $R_3$ and $R_4$, the carbon atom directly connected to a nitrogen atom in the hydrazine is not substituted by an oxo group.

The structure represented by the formula (II) is substituted by at least one —$(Q)_{k2}$-$(MET)_{k1}$.

In particular, the compound represented by the formula (II) is preferably selected from the group consisting of compounds represented by formulae (VII), (VIII) and (IX) to provide a higher sensitivity.

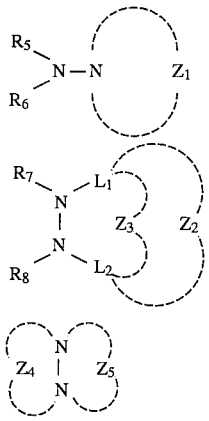

In these formulae, $R_5$, $R_6$, $R_7$ and $R_8$ each represents an alkyl group, an aryl group or a heterocyclic group.

$Z_1$ represents a $C_{4-6}$ alkylene group.

$Z_2$ represents a $C_2$ alkylene group.

$Z_3$ represents a $C_{1-2}$ alkylene group.

$Z_4$ and $Z_5$ each represents a $C_3$ alkylene group.

$L_1$ and $L_2$ each represents a methine group.

In $R_5$, $R_6$, $R_7$, $R_8$, $Z_1$, $Z_4$ and $Z_5$, the carbon atom directly connected to a nitrogen atom in the hydrazine is not substituted by an oxo group.

In each formulae (VII), (VIII) and (IX) at least one —$(Q)_{k2}$-$(MET)_{k1}$ are substituted.

More preferably, the compound represented by the formula (II) is one selected from the compounds represented by the formulae (VII) and (VIII), particularly the formula (VII).

The formula (II) will be further described hereinafter.

Examples of $R_1$, $R_2$, $R_3$ and $R_4$ include an unsubstituted alkyl group (e.g., methyl, ethyl, propyl, isopropyl, butyl, isobutyl, hexyl, octyl, dodecyl, octadecyl, cyclopentyl, cyclopropyl, cyclohexyl), and a substituted alkyl group. If the substituent on the substituted alkyl group is denoted as A, the substituent A is not specifically limited. Examples of such a substituent include a carboxyl group, a sulfo group, a cyano group, a halogen atom (e.g., fluorine, chlorine, bromine, iodine), a hydroxyl group, an alkoxycarbonyl group (e.g., methoxycarbonyl, ethoxycarbonyl, phenoxybarbonyl, benzyloxycarbonyl), an alkoxy group (e.g., methoxy, ethoxy, benzyloxy, phenethyloxy), an aryloxy group having 6 to 18 carbon atoms (e.g., phenoxy, 4-methylphenoxy, α-naphthoxy), an acyloxy group (e.g., acetyloxy, propionyloxy), an acyl group (e.g., acetyl, propionyl, benzoyl, mesyl), a carbamoyl group (e.g., carbamoyl, N,N-dimethylcarbamoyl, morpholinocarbonyl, piperidinocarbonyl), a sulfamoyl group (e.g., sulfamoyl, N,N-dimethylsulfamoyl, morpholinosulfonyl, piperidinosulfonyl), an aryl group (e.g., phenyl, 4-chlorophenyl, 4-methylphenyl, α-naphthyl), a heterocyclic group (e.g., 2-pyridyl, tetrahydrofuryl, morpholino, 2-thiopheno), an amino group (e.g., amino, dimethylamino, anilino, diphenylamino), an alkylthio group (e.g., methylthio, ethylthio), an alkylsulfonyl group (e.g., methylsulfonyl, propylsulfonyl), an alkylsulfinyl group (e.g., methylsulfinyl), a nitro group, a phosphoric group, an acylamino group (e.g., acetylamino), an ammonium group (e.g., trimethylammonium, tributylammonium), a mercapto group, a hydrazino group (e.g., trimethylhydrazino), an ureide group (e.g., ureide, N,N-dimethylureide), an imide group, and an unsaturated hydrocarbon group (e.g., vinyl, ethynyl, 1-cyclohexenyl, benzylidine, benzylidene). The number of carbon atoms contained in the substituent A is preferably 1 to 18. Substituent A may further be substituted.

Specific examples of $R_1$, $R_2$, $R_3$ and $R_4$ include an alkyl group (e.g., carboxymethyl, 2-carboxyethyl, 3-carboxypropyl, 4-carboxybutyl, 2-sulfoethyl, 3-sulfopropyl, 4-sulfobutyl, 3-sulfobutyl, 2-hydroxy-3-sulfopropyl, 2-cyanoethyl, 2-chloroethyl, 2-bromoethyl, 2-hydroxyethyl, 3-hydroxypropyl, hydroxymethyl, 2-hydroxyethyl, 2-methoxyethyl, 2-ethoxyethyl, 2-ethoxycarbonylethyl, methoxycarbonylmethyl, 2-methoxyethyl, 2-ethoxyethyl, 2-phenoxyethyl, 2-acetyloxyethyl, 2-propionyloxyethyl, 2-acetylethyl, 3-benzoylpropyl, 2-carbamoylethyl, 2-morpholinocarbonylethyl, sulfamoylmethyl, 2-(N,N-dimethylsulfamoyl)ethyl, benzyl, 2-naphthylethyl, 2-(2-pyridyl)ethyl, allyl, 3-aminopropyl, 3-diethylaminopropyl, methylthiomethyl, 2-methylsulfonylethyl, methylsulfinylmethyl, 2-acetylaminoethyl, 3-trimethylammoniumethyl, 2-mercaptoethyl, 2-trimethylhydrazinoethyl, methylsulfonylcarbamoylmethyl, (2-methoxy)ethoxymethyl), an aryl group (e.g., phenyl, α-naphthyl, β-naphthyl, phenyl and naphthyl groups substituted by the foregoing substituents V), and heterocyclic group (e.g., 2-pyridyl, 2-thiazolyl, 2-pyridyl substituted by the foregoing substituent A).

$R_1$ and $R_2$, $R_3$ and $R_4$, $R_1$ and $R_3$, and $R_2$ and $R_4$ may be connected to each other to form a ring but may not form an aromatic ring. These rings may be substituted by, for example, the foregoing substituent A.

In $R_1$, $R_2$, $R_3$ and $R_4$, the carbon atom directly connected to a nitrogen atom in the hydrazine is not substituted by an oxo group. For example, $R_1$, $R_2$, $R_3$ and $R_4$ each is not an acetyl group, a carboxyl group, a benzoyl group or a formyl group. If two of $R_1$, $R_2$, $R_3$ and $R_4$ form a ring, it is not a malonyl group, a succinyl group, a glutaryl group or an adipoyl group.

In $R_1$, $R_2$, $R_3$ and $R_4$, the carbon atom directly connected to a nitrogen atom in the hydrazine is preferably not substituted by a thioxo group (e.g., thioacetyl, thioaldehyde, thiocarboxyl, thiobenzoyl).

Even more preferred examples of $R_1$, $R_2$, $R_3$ and $R_4$ include the foregoing unsubstituted alkyl group, substituted alkyl group, and alkylene group obtained by the connection of $R_1$ to $R_2$, $R_3$ to $R_4$, $R_1$ to $R_3$, or $R_2$ to $R_4$ wherein atoms constituting the ring include no atoms other than carbon atom (e.g., oxygen, sulfur, nitrogen) (The alkylene group may be substituted by, e.g., the foregoing substituent A).

In $R_1$, $R_2$, $R_3$ and $R_4$, the carbon atom directly connected to a nitrogen atom in the hydrazine preferably constitutes an unsubstituted methylene or alkyl group (e.g., methyl, ethyl) or a substituted methylene group. In particular, $R_1$, $R_2$, $R_3$ and $R_4$ each is preferably an unsubstituted alkyl group (e.g., methyl, ethyl, propyl, butyl) or a substituted alkyl group such as a sulfoalkyl group (e.g., 2-sulfoethyl, 3-sulfopropyl, 4-sulfobutyl, 3-sulfobutyl), a carboxyalkyl group (e.g., carboxymethyl, 2-carboxyethyl) and a hydroxyalkyl group (e.g., 2-hydroxyethyl). Even more preferably, $R_1$ and $R_2$, $R_3$ and $R_4$, $R_1$ and $R_2$ and $R_4$ are connected to each other via an alkylene chain to form 5- or 7-membered rings.

The hydrazine structure represented by the formula (II) is substituted by at least one $(Q)_{k2}$-$(MET)_{k1}$. The position at which $(Q)_{k2}$-$(MET)_{k1}$ substitutes on the hydrazine structure may be on any of $R_1$, $R_2$, $R_3$ and $R_4$.

In consideration of an advantages in synthesis and storage, the hydrazine compound represented by the formula (II)

may be isolated in the form of salt. In this case, any compound which can form salts with hydrazines can be used. Preferred examples of the salts thus formed will be given below.

Preferred examples of such salts include arylsulfonates (e.g., p-toluenesulfonate, p-chlorobenzenesulfonate), aryldisulfonates (e.g., 1,3-benzenedisulfonate, 1,5-naphthalenesulfonate, 2,6-naphthalenedisulfonate), thiocyanates, picrates, carboxylates (e.g., oxalate, acetate, benzoate, hydrogen oxalate), halides (e.g., hydrochlorate, hydrofluorate, hydrobromate, hydroiodate), sulfates, perchlorates, tetrafluoroborates, sulfites, nitrates, phosphates, carbonates, and bicarbonates.

Preferred among these salts are hydrogen oxalate, oxalate, and hydrochlorate.

The formula (VII) will be further described hereinafter.

$R_5$ and $R_6$ have the same meaning and preferred range as $R_1$, $R_2$, $R_3$ and $R_4$.

In particular, $R_5$ and $R_6$ each is preferably an alkyl group, or preferably is connected to each other to form a tetramethylene group.

$Z_1$ represents an alkylene group having 4 or 6 carbon atoms, preferably 4 carbon atoms. The carbon atom directly connected to a nitrogen atom in the hydrazine structure is not substituted by an oxo group.

The alkylene group may or may not be substituted by. substituents. Examples of such substituents include the foregoing substituent A. The carbon atom directly connected to a nitrogen atom in the hydrazine structure preferably constitutes an unsubstituted methylene or alkyl group (e.g., methyl, ethyl) or substituted methylene group.

A particularly preferred example of $Z_1$ is an unsubstituted tetramethylene group.

The hydrazine structure represented by the formula (VII) is substituted by at least one $-(Q)_{k2}-(MET)_{k1}$. The position, at which $-(Q)_{k2}-(MET)_{k1}$ substitutes on the hydrazine structure, is on any of $R_5$, $R_6$ and $Z_1$, preferably $R_5$ and $R_6$.

The formula (VIII) will be further described hereinafter.

$R_7$ and $R_8$ have the same meaning and preferred range as $R_1$, $R_2$, $R_3$ and $R_4$.

In particular, $R_7$ and $R_8$ each are preferably an alkyl group, or $R_7$ and $R_8$ are preferably connected to each other to form a trimethylene group.

$Z_2$ represents a $C_2$ alkylene group.

$Z_3$ represents a $C_{1-2}$ alkylene group.

These alkylene groups may or may not be substituted by substituents. Examples of such substituents include the foregoing substituent A.

$Z_2$ is preferably an unsubstituted ethylene group.

$Z_3$ is preferably an unsubstituted methylene or ethylene group.

$L_1$ and $L_2$ each represents a methine group or a substituted methine group. Examples of substituents on such a substituted methine group include the foregoing substituent A. A preferred example of such substituents is an unsubstituted alkyl group (e.g., methyl, t-butyl).

$L_1$ and $L_2$ each is preferably an unsubstituted methine group.

The hydrazine structure represented by the formula (VIII) is substituted by at least one $-(Q)_{k2}-(MET)_{k1}$. The position at which $-(Q)_{k2}-(MET)_{k1}$ substitutes on the hydrazine structure is on any of $R_7$, $R_8$, $Z_7$, $L_1$ and $L_2$, preferably $R_7$ and $R_8$.

The formula ( IX ) will be further described hereinafter.

$Z_4$ and $Z_5$ each represents a $C_3$ alkylene group.

The carbon atom directly connected to a nitrogen atom in the hydrazine structure is not substituted by an oxo group.

These alkylene groups may or may not be substituted by substituents. Examples of such substituents include the foregoing substituent A. The carbon atom directly connected to a nitrogen atom in the hydrazine structure preferably constitutes an unsubstituted methylene or an alkyl group (e.g., methyl, ethyl) or a substituted methylene group.

Particularly preferred examples of $Z_4$ and $Z_5$ include an unsubstituted trimethylene group, an unsubstituted alkylene group, and a substituted trimethylene group (e.g., 2,2-dimethyltrimethylene).

The hydrazine structure represented by the formula (IX) is substituted by at least one $-(Q)_{k2}-(MET)_{k1}$. The position at which $-(Q)_{k2}-(MET)_{k1}$ substitutes on the hydrazine structure is on any of $Z_4$ and $Z_5$.

The compounds represented by the formulae (II), (III) and (IV) may be isolated in the form of salts as in the compound represented by the formula (I). Examples of such salts include those given with reference to the salt represented by the formula (I). Preferred examples of such salts include a hydrogen oxalate, an oxalate, and a hydrochlorate.

In the structure represented by the formula (I), the oxidation potential of Hy is lower than that of MET.

Typical examples of the compound represented by the formula (I) will be given below, but the present invention should not be construed as being limited thereto. (1) Compound having a methine dye represented by the formula (III) and a hydrazine covalently bonded to each other (III-1)

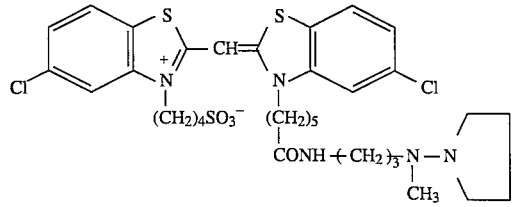

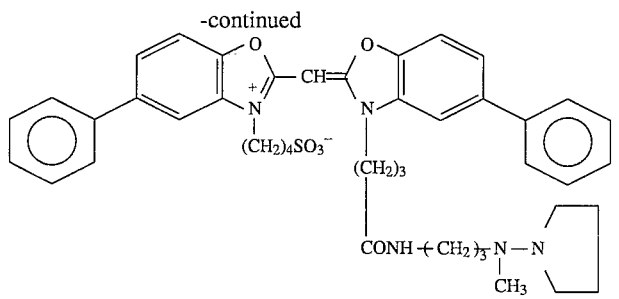
(III-2)
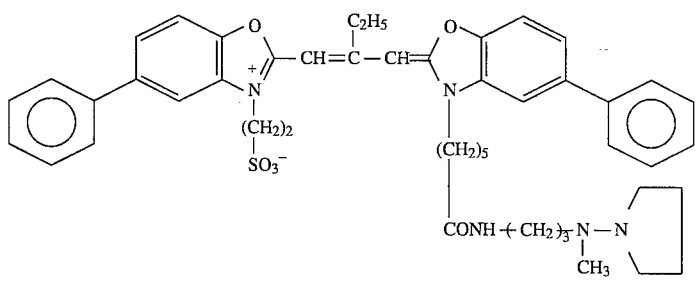
(III-3)
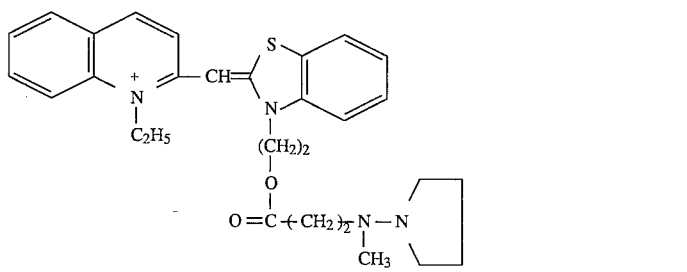
(III-4)
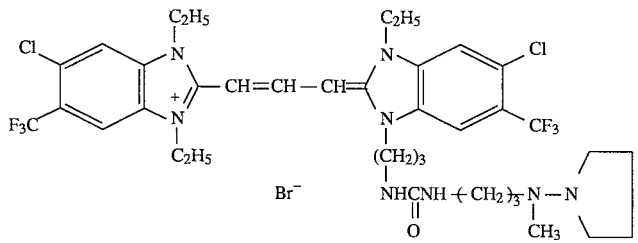
(III-5)
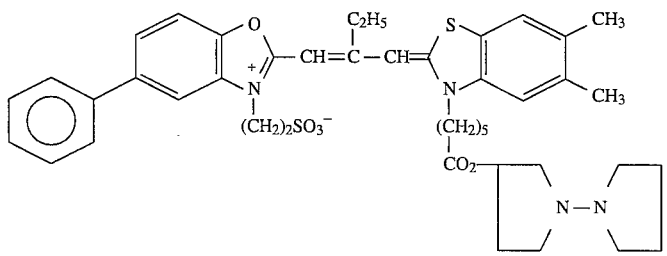
(III-6)
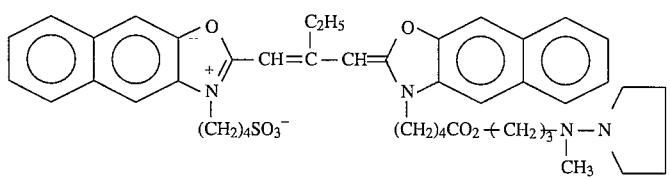
(III-7)

-continued
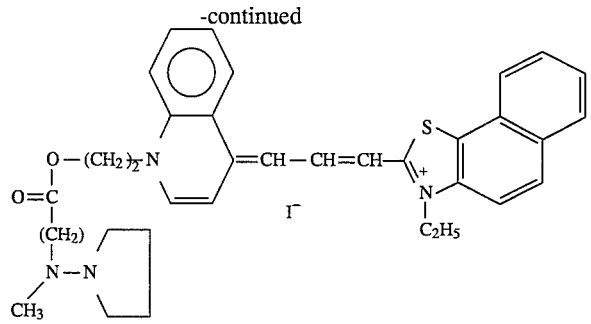
(III-8)
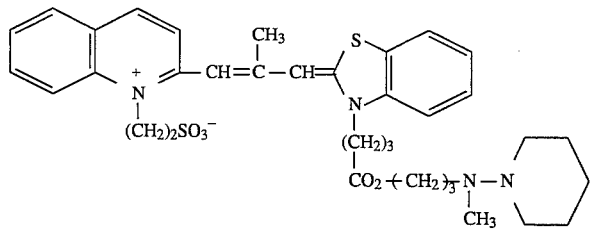
(III-9)
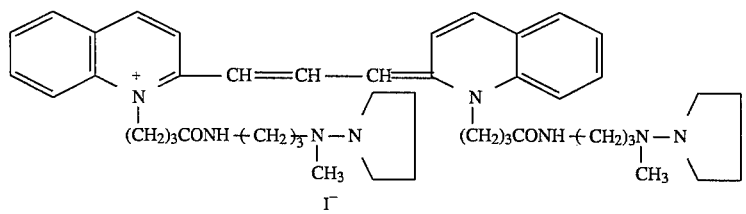
(III-10)
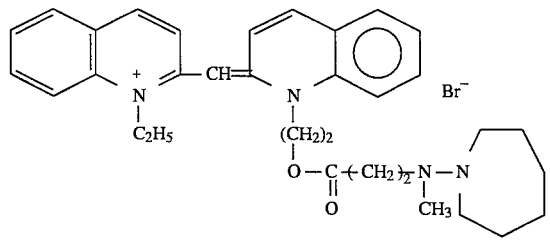
(III-11)
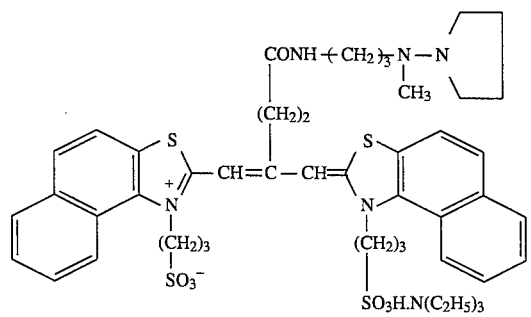
(III-12)
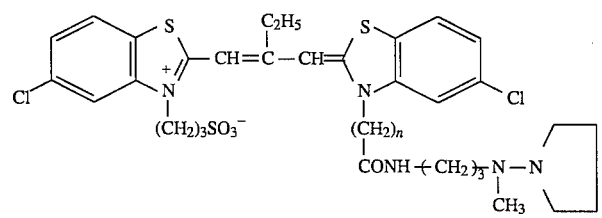
n = 3 (III-13)
n = 4 (III-14)
n = 5 (III-15)

-continued
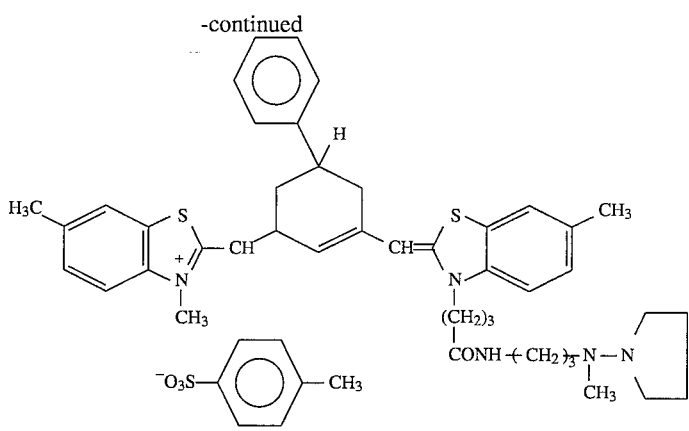 (III-16)
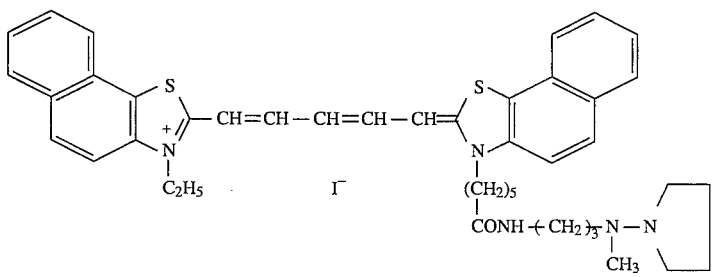 (III-17)
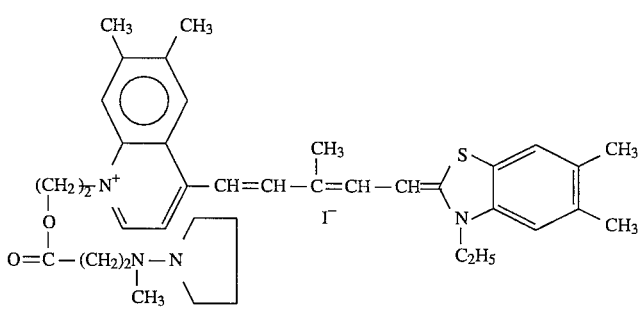 (III-18)
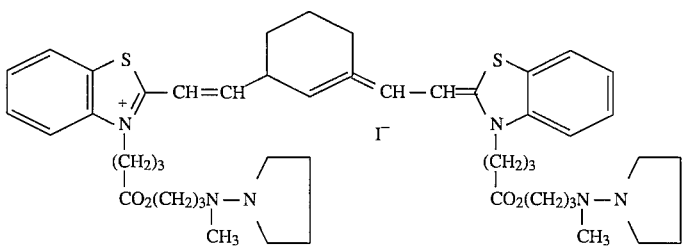 (III-19)
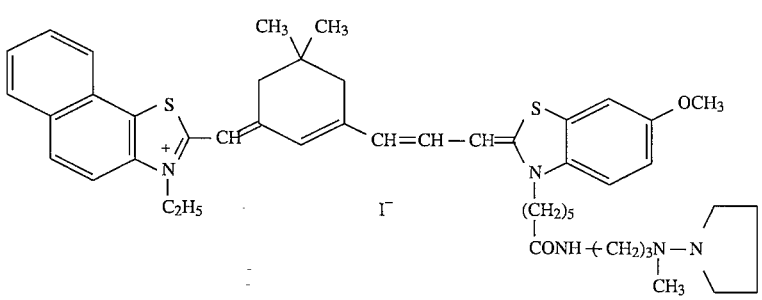 (III-20)

-continued
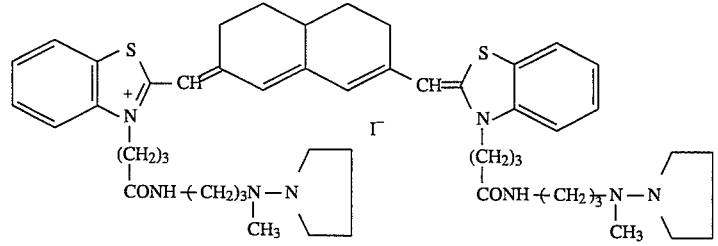
(III-21)
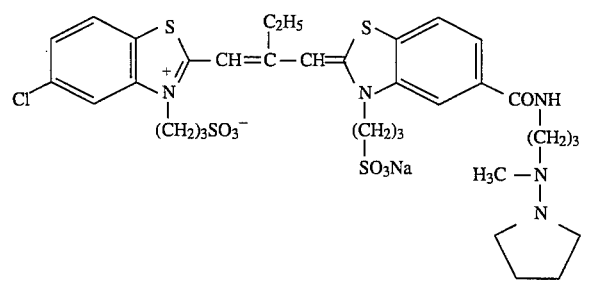
(III-22)
(2) Compound having a methine dye represented by the formula (IV) and a hydrazine covalently bonded to each other
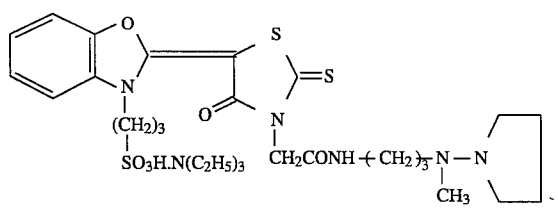
(IV-1)
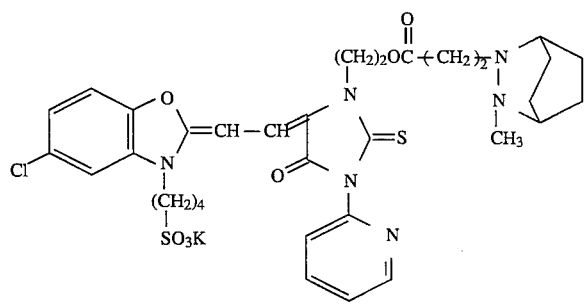
(IV-2)
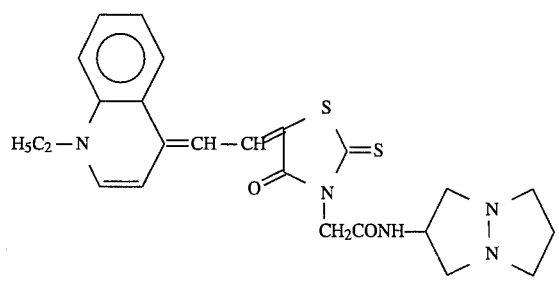
(IV-3)

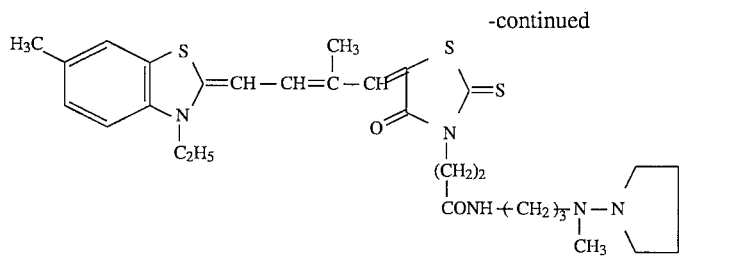
(IV-4)
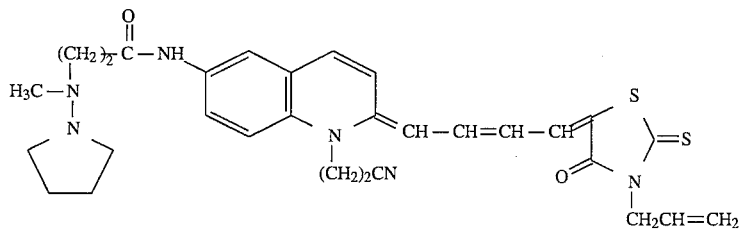
(IV-5)
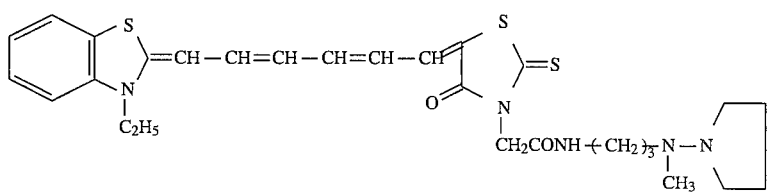
(IV-6)
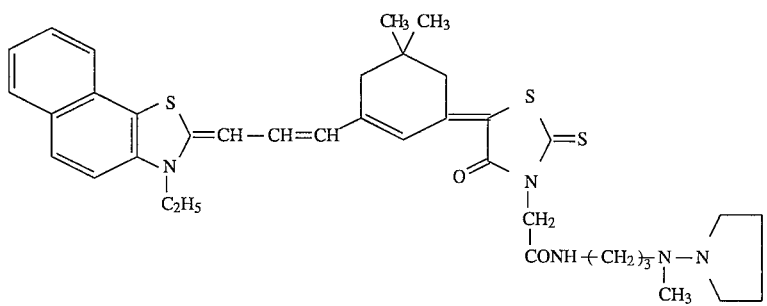
(IV-7)
(3) Compound having a methine dye represented by the formula (V) and a hydrazine covalently bonded to each other
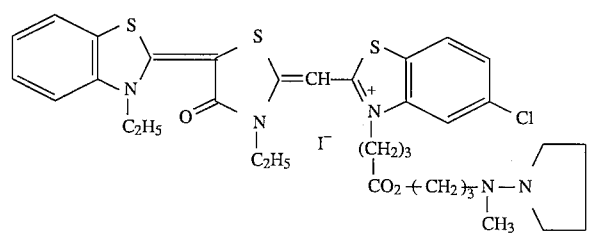
(V-1)
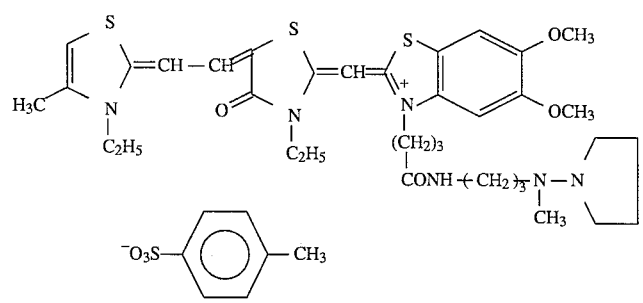
(V-2)

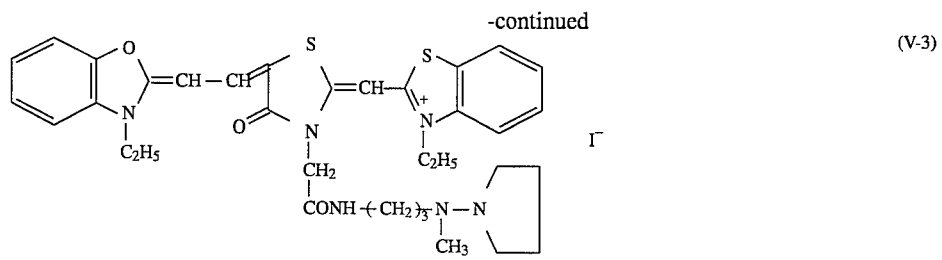
(V-3)
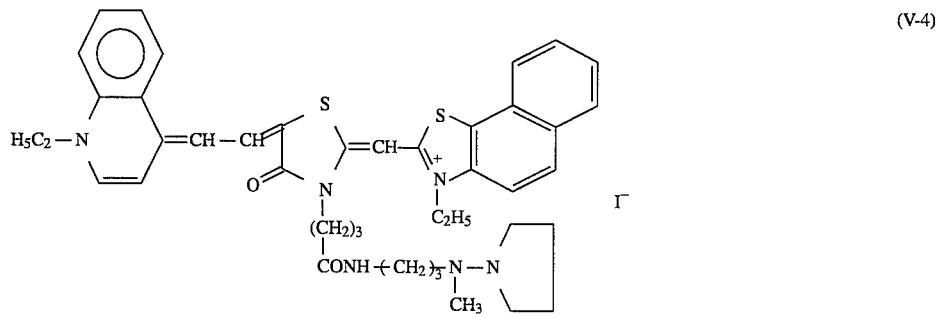
(V-4)
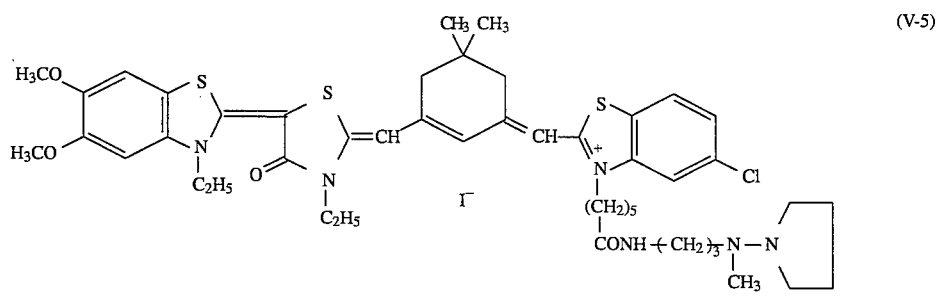
(V-5)
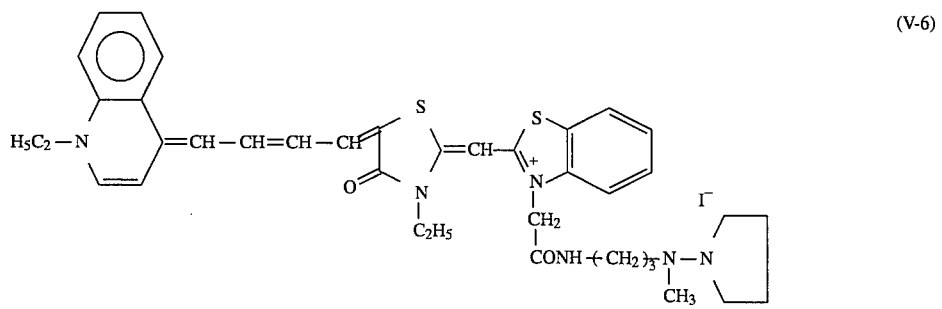
(V-6)
(4) Compound having a methine dye represented by the formula (VI) and a hydrazine covalently bonded to each other

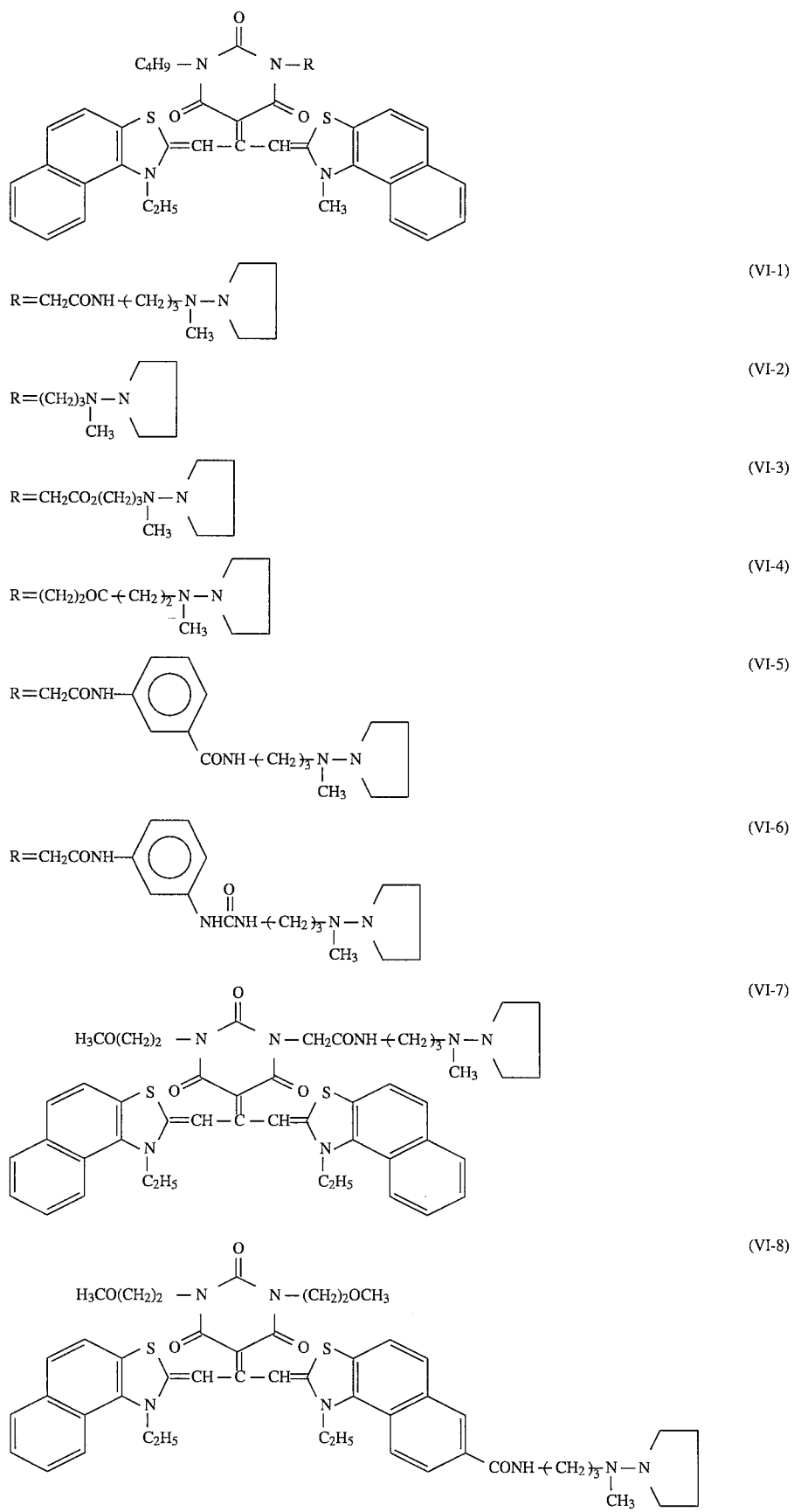

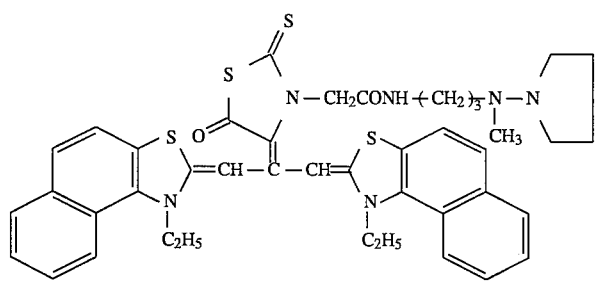

(VI-9)

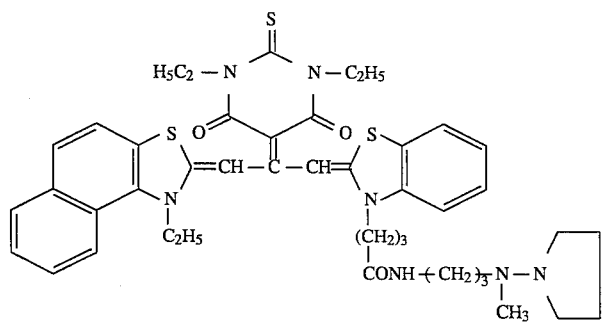

(VI-10)

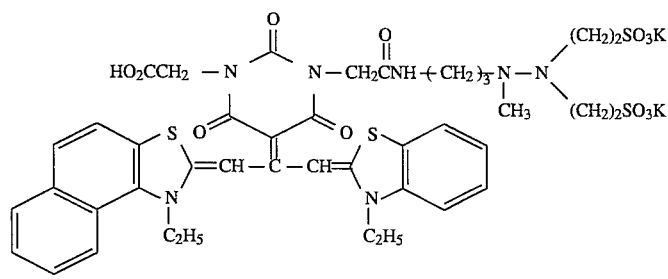

(VI-11)

The synthesis of MET in the formula (I) to be used in the present invention can be accomplished by any prior known method as disclosed in F. M. Hamer, "Heterocyclic Compounds—Cyanine Dyes and Related Compounds", John Wiley & Sons, New York, London, 1964, D. M. Sturmer, "Heterocyclic Compounds—Special topics in heterocyclic chemistry", Chapter 18, Section 14, pp. 482–515, John Wiley & Sons, New York, London, 1977, "Rodd's Chemistry of Carbon Compounds", 2nd Ed., vol. IV, part B, 1977, chapter 15, pp. 369–422, 2nd Ed., vol. IV, part B, 1985, chapter 15, pp. 267–296, Elsvier Science Publishing Company Inc., New York, etc.

The synthesis of hydrazines represented by the formula (II) of the present invention can be accomplished by various methods. For example, a method which comprises alkylating a hydrazine can be used. As the alkylation method there have been known a method which comprises direct alkylation with a haloide alkyl and an alkylester sulfonate, a method which comprises reductive alkylation with a carbonyl compound and a sodium cyanoborohydride, a method which comprises acylation followed by reduction with aluminum lithium hydride, etc. These methods are described in, e.g., S. R. Sandler and W. Karo, "Organic Functional Group Preparation", vo. 1, chapter 14, pp. 434–465, 1968, Academic Press, and E. L. Clennan et al., "Journal of the American Chemical Society", vol. 112, No. 13, page 5,080, 1990. The synthesis of hydrazines represented by the formula (II) can be accomplished by referring to these citations.

The bond formation reaction such as amide bond formation reaction and ester bond formation reaction of —$(Q)_{k2}$- (Hy) moiety can be accomplished by any method as known in organic chemistry. In some detail, a method which comprises the connection of MET to Hy, a method which comprises the connection of Hy to a synthesis starting material and intermediate of polymethine dye followed by reaction for conversion to dye, a method which comprises the connection of a synthesis starting material and intermediate of Hy to a polymethine dye moiety followed by the synthesis of Hy, or like method can be properly selected. For details of synthesis reaction for connection, reference can be made to "Shinjikken Kagaku Koza 14 (New Institute of Experimental Chemistry 14)—Yuki Kagobutu no Gosei to Hannou (Synthesis and Reaction of Organic Compounds)", Chemical Sosicety of Japan, vols. I–V, Maruzen, Tokyo, 1977, Yoshio Ogata, "Organic Chemistry", Maruzen, Tokyo, 1962, L. F. Fieser and M. Fieser, "Advanced Organic Chemistry", Maruzen, Tokyo, 1962, and many other handbooks of organic synthesis reaction.

The reaction will be further described in Examples 1 to 5.

The compound represented by the formula (I) according to the present invention may be used singly but preferably in combination with other spectral sensitizing dyes. As such spectral sensitizing dyes there may be preferably used cyanine dyes (dyes having a structure represented by the formula (III) wherein $(Q)_{k2}$-(Hy) is not substituted), melocyanine dyes (dyes having a structure represented by the formula (IV) wherein $(Q)_{k2}$-(Hy) is not substituted), rhodacyanine dyes (dyes having a structure represented by the formula (V) wherein $(Q)_{k2}$-(Hy) is not substituted), and allopolar dyes (dyes having a structure represented by the formula (VI) wherein $(Q)_{k2}$-(Hy) is not substituted). Further, hemicyanine dyes, oxonol dyes, hemioxonol dyes, and styryl dyes can be preferably used.

Most preferably, the compound represented by the formula (I) may be used in combination with an allopolar dye represented by the formula (VI) wherein $(Q)_{k2}$-(Hy) is substituted or a thiocarbocyanine dye represented by the formula (III) wherein $(Q)_{k2}$-(Hy) is not substituted.

The compound represented by the formula (I) of the present invention and the sensitizing dye to be used in the present invention may be incorporated in the silver halide emulsion of the present invention in the form of direct dispersion or in the form of solution in a solvent such as water, methanol, ethanol, propanol, acetone, methylcellosolve, 2,2,3,3-tetrafluoropropanol, 2,2,2-trifluoroethanol, 3-methoxy-1-propanol, 3-methoxy-1-butanol, 1-methoxy-2-propanol, N,N-dimethylformamide, etc., singly or in admixture.

Alternatively, a method which comprises dissolving a dye or the like in a volatile organic solvent, dispersing the solution in water or a hydrophilic colloid, and then adding the dispersion in an emulsion as described in U.S. Pat. No. 3,469,987; a method which comprises dispersing a water-insoluble dye or the like in a water-soluble solvent without dissolving, and then adding the dispersion to an emulsion as described in JP-B-46-24185 (The term "JP-B" as used herein means an "examined Japanese patent publication"); a method which comprises dissolving a dye or the like in an acid, and then adding the solution to an emulsion, or dissolving a dye or the like in water in the presence of an acid or base, and then adding the aqueous solution to an emulsion as described in JP-B-44-23389, JP-B-44-27555, and JP-B-57-22091; a method which comprises preparing an aqueous solution or colloidal dispersion of a dye or the like in the presence of a surface active agent, and then adding the aqueous solution or colloidal dispersion to an emulsion as described in U.S. Pat. Nos. 3,822,135 and 4,006,026; a method which comprises directly dispersing a dye or the like in a hydrophilic colloid, and then adding the dispersion to an emulsion as described in JP-A-53-102733 and JP-A-58-105141; and a method which comprises dissolving a dye or the like with a compound for making red shift, and then adding the solution to an emulsion as described in JP-A-51-74624 can be used.

Further, the dissolution of the dye can be effected with the aid of ultrasonic wave.

The time during which the sensitizing dye to be used in the present invention or the compound represented by the formula (I) is added to the silver halide emulsion of the present invention may be any step in the preparation of the emulsion which has been heretofore considered useful. For example, the sensitizing dye may be added to the system during the formation of silver halide grains and/or before or during the desalting and/or between after the desalting and before the beginning of the chemical ripening as disclosed in U.S. Pat. Nos. 2,735,766, 3,628,960, 4,183,756, and 4,225,666, and JP-A-58-184142, and 60-196749. Alternatively, the sensitizing dye may be added to the system shortly before or during the chemical ripening or at any step between the chemical ripening and the coating of the emulsion as disclosed in JP-A-58-113920. Further, a sensitizing dye compound of the present invention may be added batchwise to the system singly or in combination with compounds having different kinds of structures during the formation of grains and during or after the chemical ripening or before and during the chemical ripening and after the chemical ripening. The compounds to be added batchwised and the combination of compounds to be added may be altered properly.

The optimum amount of the sensitizing dye of the present invention to be added is in the range of $4\times10^{-8}$ to $8\times10^{-2}$ mol per mol of silver halide, though depending on the shape and size of silver halide grains.

The compound represented by the formula (I) is preferably added to the silver halide emulsion in an amount of $1\times10^{-6}$ to $5\times10^{-1}$ mol, more preferably $1\times10^{-5}$ to $2\times10^{-2}$ mol per mol of silver halide, regardless of when it is added, i.e., before or after the sensitizing dye.

The molar proportion of the sensitizing dye to the compound represented by the formula (I) may be in any range but is advantageously in the range of 1000/1 to 1/1000, particularly 100/1 to 1/10.

The silver halide employable in the present invention may be any of silver chloride, silver bromide, silver iodide, silver bromochloride, silver bromochloroiodide and silver bromoiodide. The silver halide emulsion employable in the present invention may comprise one of these silver halides or a plurality of these silver halides in admixture. The silver halide grain may differ in phase from core to shell, or may have a multi-layered integrated structure, or may have a localized phase on the surface thereof, or may have a uniform phase throughout its entire depth. Further, these structures may be present in admixture.

The silver halide grain to be used in the present invention may be either monodisperse or polydisperse. The silver halide grain to be used in the present invention may have a regular crystal form such as cube, octahedron and tetradecahedron, an irregular crystal form, or composite thereof. Alternatively, a tabular silver halide grain comprising AgX grains having an aspect ratio (diameter of silver halide grain in circle equivalence/thickness of grain) of not less than 3 in a proportion of not less than 50% based on the total projected area of grain may be used. The aspect ratio of the tabular silver halide grains is preferably not less than 5 or 8. The emulsion may comprise the foregoing various crystal forms in admixture. These emulsions may be of the surface latent image type in which a latent image is formed mainly on the surface thereof or the internal latent image type in which a latent image is formed inside the grain.

The preparation of photographic emulsion to be used in the present invention can be accomplished by any suitable method as disclosed in P. Glafkides, "Chimie et Physique Photographique", Paul Montel, 1967, G. F. Duffin, "Photographic Emulsion Chemistry", The Focal Press, 1966, V. L. Zelikman et al., "Making and Coating Photographic Emulsion", The Focal Press, 1964, F. H. Claes et al, "The Journal of Photographic Science", (21) 39–50, F. H. Claes et al., "The Journal of Photographic Science", (21) 85–92, 1973, JP-B-55-42737, U.S. Pat. Nos. 4,400,463 and 4,801,523, JP-A-62-218959, JP-A-63-213836, JP-A-63-218938, and JP-A-2-32. In some detail, the emulsion can be prepared by any of the acid process, the neutral process, the ammonia process, etc. The reaction between a soluble silver salt and a soluble halogen salt can be carried out by any of a single jet process, a double jet process, a combination thereof, and the like. A method in which grains are formed in the presence of excess silver ions (so-called reverse mixing method) may be used. Further, a so-called controlled double jet process, in which a pAg value of a liquid phase in which silver halide grains are formed is maintained constant, may also be used. According to the controlled double jet process, a silver halide emulsion having a regular crystal form and an almost uniform grain size can be obtained.

Further, an emulsion prepared by a so-called conversion method including a process by which silver halide grains already formed are converted before the completion of a process for the formation of silver halide grains or an emulsion prepared by the similar halogen conversion after the completion of a process for the formation of silver halide grains may be used as well.

During the preparation of silver halide grains of the present invention, a silver halide solvent may be used.

Examples of silver halide solvents which are often used in such a case include thioether compounds as disclosed in U.S. Pat. Nos. 3,271,157, 3,574,628, 3,704,130, and 4,276, 347, thione compounds and thiourea compounds as disclosed in JP-A-53-144319, JP-A-53-82408, and JP-A-55-77737, and amine compounds as disclosed in JP-A-54-100717. These solvents can be used in the present invention. Further, ammonia can be used so far as it gives no adverse effects.

During the preparation of silver halide grains of the present invention, a method which involves the rise in the addition rate, added amount and added concentration of silver salt solution (e.g., aqueous solution of silver nitrate) and halide solution (e.g., aqueous solution of sodium chloride) with time is preferably used to expedite the growth of grains. For details of this method, reference can be made to British Patent 1,335,925, U.S. Pat. Nos. 3,672,900, 3,650, 757, and 4,242,445, JP-A-55-142329, JP-A-55-158124, JP-A-55-113927, JP-A-58-113928, JP-A-58-111934, and JP-A-58-111936.

During the formation or physical ripening of silver halide grains, a cadmium salt, zinc salt, lead salt, potassium salt, rhenium salt, ruthenium salt, iridium salt or complex salt thereof, rhodium salt of complex salt thereof, or iron salt or complex salt thereof may be present in the system. Preferred among these salts are rhenium salt, iridium salt, rhodium salt, and iron salt.

The amount of such a salt to be added may be arbitrary as necessary. For example, an iridium salt (e.g., $Na_3IrCl_6$, $Na_2IrCl_6$, $Na_3Ir(CN)_6$) may be used in an amount of $1\times10^{-8}$ mol to $1\times10^{-5}$ mol per mol of silver. A rhodium salt (e.g., $RhCl_3$, $K_3Rh(CN)_6$) may be used in an amount of $1\times10^{-8}$ mol to $1\times10^{-5}$ mol per mol of silver.

The silver halide emulsion of the present invention may not be chemically sensitized but may be chemically sensitized as necessary.

Examples of chemical sensitization method employable in the present invention include gold sensitization method with a so-called gold compound (as disclosed in U.S. Pat. Nos. 2,448,060 and 3,320,069), metal sensitization method such as with iridium, platinum, rhodium and palladium (as disclosed in U.S. Pat. Nos. 2,448,060, 2,566,245, and 2,566, 263), sulfur sensitization method with a sulfur-containing compound (as disclosed in U.S. Pat. No. 2,222,264), selenium sensitization method with a selenium compound, reduction sensitization method with a tin salt, thiourea dioxide, polyamide or the like (as disclosed in U.S. Pat. Nos. 2,487,850, 2,518,698, and 2,521,925), and combination thereof.

The silver halide emulsion of the present invention is preferably subjected to gold sensitization, sulfur sensitization, or combination thereof. The optimum amount of the gold sensitizer and sulfur sensitizer to be added each are in the range of $1\times10^{-7}$ to $1\times10^{-2}$ mol, preferably $5\times10^{-6}$ to $1\times10^{-3}$ mol per mol of silver. If gold sensitization and sulfur sensitization are used in combination, the optimum molar proportion of gold sensitizer to sulfur sensitizer is in the range of 1:3 to 3:1, preferably 1:2 to 2:1.

The temperature at which the chemical sensitization according to the present invention is effected can be selected from values between 30° C. and 90° C. The pH value at which the chemical sensitization is effected is in the range of 4.5 to 9.0, preferably 5.0 to 7.0. The chemical sensitization time varies with temperature, kind and amount of chemical sensitizer used, pH, etc. and thus cannot be unequivocally determined. It can be arbitrarily selected from values between several minutes and several hours. It is normally between 10 minutes and 200 minutes.

The sensitizing dye of the present invention is often used in combination with a water-soluble iodide such as potassium iodide, water-soluble bromide such as potassium iodide or water-soluble thiocyanate such as potassium thiocyanate to accelerate its adsorption to silver halide grains or formation of J-aggregates for higher spectral sensitivity. In the present invention, these salts may also be preferably used. Such water-soluble bromide and water-soluble thiocyanate have a marked effect on silver chloride or silver bromochloride having a high silver chloride content.

In order to attain an ultrarapid processing requiring 30 seconds or less for development, a high silver chloride content emulsion containing a chloride of not less than 50 mol % is preferably used. As well known, iodine ion is highly development-inhibiting. For the foregoing purpose, the content of iodine ion, including the foregoing water-soluble iodide, is preferably kept at not more than 0.05 mol % per mol of silver.

In order to prepare a silver halide photographic material adapted for ultrarapid processing, a high silver chloride content emulsion having a chloride of not less than 80 mol % is preferably used. As mentioned above, such an emulsion may be preferably used in combination with a water-soluble bromide and/or water-soluble thiocyanate to accelerate the formation of J-aggregates for higher spectral sensitivity. The amount of such a salt to be added is preferably in the range of 0.03 to 3 mol %, particularly 0.08 to 1 mol % per mol of silver.

As such a high silver chloride content emulsion having a chloride of not less than 80 mol % there may be preferably used a high silver chloride content emulsion having a localized phase in grain which exhibits a high sensitivity and a high stability, particularly of latent image, when spectrally sensitized in a infrared range as disclosed in JP-A-2-248945. As disclosed in the foregoing patent, such a localized phase preferably has a silver bromide content of more than 15 mol %, more preferably from 20 to 60 mol %, the most preferably 30 to 50 mol % and a balance of silver chloride. Further, such a localized phase may be present inside or on the surface or subsurface of silver halide grain or may be divided into two portions by the surface or subsurface of grain. Moreover, such a localized phase may have a layer structure surrounding the silver halide grain or discontinuously independent structure. A specific preferred example of a localized phase having a higher silver bromide content than its surroundings is a localized phase having a silver bromide content of more than at least 15 mol % epitaxially grown locally on the surface of silver halide grain.

The silver bromide content of such a localized phase can be analyzed by X-ray diffractometry (as described in "Shin-jikken Kagaku Koza 6 (New Institute of Experimental Chemistry 6)—Kozo Kaiseki (Structural Analysis)", Chemical Society of Japan, Maruzen), XPS method (as described in "Surface Analysis, IMA, Application of Auger Electron/Photoelectron Spectroscopy", Kodansha), etc. Such a localized phase preferably comprises silver in an amount of 0.1 to 20%, more preferably 0.5 to 7% of the total amount of silver constituting the silver halide grain.

The interface of such a localized phase having a high silver bromide content with the other phases may be definite or may have a short transition region having a slow halogen composition gradient.

The formation of such a localized phase having a high silver bromide content can be accomplished by various methods. For example, a method can be used which comprises the reaction of a soluble silver salt and a soluble halide salt in a single or double jet process to form a localized phase. Alternatively, a so-called conversion method can be used which comprises the conversion of silver halide already formed to one having a smaller solubility product to form a localized phase. Further, a localized phase can be formed by adding finely divided silver bromide grains to allow them to be recrystallized on the surface of silver halide grains.

The silver halide emulsion prepared according to the present invention can be applied to either color photographic materials or black-and-white photographic materials.

Examples of color photographic materials to which the silver halide emulsion according to the present invention can be applied include color paper, color film for picture taking, and color reversal film. Examples of black-and-white photographic materials to which the silver halide emulsion according to the present invention can be applied include X-ray film, general film for picture taking, and film for printing photographic material.

Additives which can be incorporated in the photographic material to which the emulsion according to the present invention is applied are not specifically limited. For details of these additives, reference can be made to Research Disclosure, vol. 176, Item 17643 (RD17643) and vol. 187, Item 18716 (RD18716).

The pages at which various additives are described in RD17643 and RD18716 are summarized below.

TABLE 1

| Kind of additive | RD17643 | RD18716 |
| --- | --- | --- |
| 1. Chemical sensitizer | p. 23 | p. 648, right column (RC) |
| 2. Sensitivity increasing agent | " | |
| 3. Spectral sensitizer and supersensitizer | pp. 23–24 | p. 648, RC- p. 649, RC |
| 4. Brightening agent | p. 24 | |
| 5. Antifoggant and stabilizer | pp. 24–25 | p. 649, RC |
| 6. Light absorbent, filter dye, and ultraviolet absorbent | pp. 25–26 | p. 649, RC– p. 650, LC |
| 7. Stain inhibitor | p. 25, RC | p. 650, LC–RC |
| 8. Dye image stabilizer | p. 25 | p. 650, LC |
| 9. Hardening agent | p. 26 | p. 651, LC |
| 10. Binder | p. 26 | " |
| 11. Plasticizer and lubricant | p. 27 | p. 650, RC |
| 12. Coating aid and surface active agent | pp. 26–27 | " |
| 13. Antistatic agent | p. 27 | " |

The dyes will be further described hereinafter.

The photographic material according to the present invention may comprise a colloidal silver or a dye to inhibit irradiation or halation, provide a predetermined separation of the spectral sensitivity distribution of various light-sensitive layers and secure stability to safelight.

Examples of such a dye include oxonol dyes having pyrazolone nucleus, barbitutic nucleus or barbituric acid nucleus as disclosed in U.S. Pat. Nos. 506,385, 1,177,429, 1,131,884, 1,338,799, 1,385,371, 1,467,214, 1,438,102, 1,553,516, 3,247,127, 3,469,985, and 4,078,933, JP-A-48-85130, JP-A-49-114420, JP-A-52-117123, JP-A-55-161233, JP-A-59-111640, JP-B-39-22069, JP-B-43-13168, and JP-B-62-273527, other oxonol dyes as disclosed in U.S. Pat. Nos. 2,533,472, and 3,379,533, British Pat. No. 1,278, 621, JP-A-1-134447, and JP-A-1-183652, azo dyes as disclosed in British Patents 575,691, 680,631, 599,623, 786, 907, 907,125, and 1,045,609, U.S. Pat. No. 4,255,326, and JP-A-59-211043, azomethine dyes as disclosed in JP-A-50-100116, JP-A-54-118247, British Patents 2,014,598, and 750,031, anthraquinone dyes as disclosed in U.S. Pat. No. 2,865,752, arylidene dyes as disclosed in U.S. Pat. Nos. 2,538,009, 2,688,541, and 2,538,008, British Patents 584, 609, and 1,210,252, JP-A-50-40625, JP-A-51-3623, JP-A-51-10927, JP-A-54-118247, JP-B-48-3286, and JP-B-59-37303, styryl dyes as disclosed in JP-B-28-3082, JP-B-44-16594, and JP-B-59-28898, triarylmethane dyes as disclosed in British Patents 446,538, and 1,335,422, and JP-A-59-228250, melocyanine dyes as disclosed in British Patents 1,075,653, 1,153,341, 1,284,730, 1,475,228, and 1,542,807, and cyanine dyes as disclosed in U.S. Pat. Nos. 2,843,486, and 3,294,539, and JP-A-1-291247.

In order to inhibit the diffusion of these dyes, the following methods can be used. For example, a ballast group may be incorporated in these dyes so that they can be rendered nondiffusible.

A method which comprises allowing a dissociated anionic dye and a hydrophilic polymer having electric charge opposite the anionic dye as a mordant to be present in a layer to effect interaction with dye molecules so that the dye is localized in a specified layer is disclosed in U.S. Pat. Nos. 2,548,564, 4,124,386, and 3,625,694.

Further, a method which comprises dyeing a specified layer with a water-insoluble dye solid is disclosed in JP-A-56-12639, JP-A-55-155350, JP-A-55-155351, JP-A-63-27838, JP-A-63-197943, EP15,601.

A method which comprises dyeing a specified layer with finely divided metal salt grains which have adsorbed a dye is disclosed in U.S. Pat. Nos. 2,719,088, 2,496,841, and 2,496,843, JP-A-60-45237.

Among the foregoing additives, as fog inhibitor and stabilizer there can be preferably used azoles such as benzothiazolium salt, nitroimidazole, nitrobenzimidazole, chlorobenzimidazole, bromobenzimidazole, nitroindazole, benzotriazole and aminotriazole, mercapto compounds such as mercaptothiazole, mercaptobenzothiazole, mercaptobenzimidazole, mercaptothiadiazole, mercaptotetrazole (particularly 1-phenyl-5-mercaptotetrazole), mercaptopyrimidine and mercaptotriazine, thioketo compounds such as oxazolinethione, azaindenes such as triazaindene, tetraazaindene (particularly 4-hydroxy-substituted (1,3,3a,7)tetraazaindene) and pentaazaindene, benzenethiosulfonic acid, benzenesulfinic acid, and amide benzenesulfonate.

As the color coupler there may be preferably used a nondiffusible color coupler having a hydrophobic group called ballast group in its molecule or polymerized color coupler. The color coupler may be either two-equivalent or four-equivalent of silver ion. Alternatively, a colored coupler having an effect of correcting color, or a coupler which releases a development inhibitor upon development (so-called DIR coupler) may be incorporated in the system. Further, a noncolor DIR coupling compound which undergoes coupling reaction to give a colorless product and release a development inhibitor may be incorporated in the system.

Preferred examples of these couplers are described in JP-A-2-33144, line 14, upper right column, page 3—last line, upper left column, page 18, and line 6, upper right column, page 30—line 11, lower right column, page 35.

In more detail, examples of magenta couplers include 5-pyrazolone coupler, pyrazolobenzimidazole coupler, pyrazolotriazole coupler, pyrazolotetrazole coupler, cyanoacetylcumaron coupler, and closed-chain acylacetonitrile coupler. Examples of yellow couplers include acrylacetamide coupler (e.g., benzoylacetanilide, pivaloylacetanilide). Examples of cyan couplers include naphthol coupler, and phenol coupler. As cyan couplers there can be preferably used phenolic coupler having an ethyl group in the meta-position of phenol nucleus, 2,5-diacylamino-substituted phenolic coupler, phenolic coupler having a phenylureide group in the 2-position and an acylamino group in the 5-position, and coupler substituted by sulfonamide, amide or the like in the 5-position on naphthol as disclosed in U.S. Pat. Nos. 3,772,002, 2,772,162, 3,758,308, 4,126,396, 4,334,011, 4,327,173, 3,446,622, 4,333,999, 4,451,559, and 4,427,767. These cyan couplers exhibit an excellent image fastness.

Two or more of these couplers may be incorporated in the same layer or the same compound may be incorporated in two or more layers to meet the requirements for photographic materials.

Typical examples of discoloration inhibitors include hydroquinones, 6-hydroxychromans, 5-hydroxycumarans, spirocumaran, p-alkoxyphenols, hindered phenols such as bisphenols, gallic acid derivatives, methylenedioxybenzenes, aminophenols, hindered amines, and ether or ester derivatives obtained by silylation or alkylation of phenolic hydroxyl group in these compounds. Further, metal complexes such as (bissalicylaldoximate)nickel complex and (bis-N,N-dialkyldithiocarbamate)nickel complex can be used as well.

The photographic processing of the photographic material according to the present invention can be accomplished by any known method with any known processing solution. The processing temperature may be normally selected from those between 18° C. and 50° C. but may fall below 18° C. or exceed 50° C. Development for the formation of silver image (black-and-white photographic processing) or color photographic processing comprising development for the formation of dye image can be applied depending on the purpose.

The black-and-white developer may comprise known developing agents such as dihydroxybenzenes (e.g., hydroquinone), 3-pyrazolidones (e.g., 1-phenyl-3-pyrazolidone) and aminophenols (e.g., N-methyl-p-aminophenol), singly or in combination.

A color developer normally comprises an aqueous alkaline solution containing a color developing agent. As such a color developing agent there can be used a known primary aromatic amine developing agent such as phenylenediamines (e.g., 4-amino-N,N-diethylaniline, 3-methyl-4-amino-N,N-diethylaniline, 4-amino-N-ethyl-N-β-hydroxyethylaniline, 3-methyl-4-amino-N-ethyl-N-β-hydroxyethylaniline, 3-methyl-4-amino-N-ethyl-N-β-methanesulfoamideethylaniline, 4-amino-3-methyl-N-ethyl-N-β-methoxyethylaniline).

Further, developing agents as described in L. F. A. Meson, "Photographic Processing Chemistry", Focal Press, 1966, pp. 226–229, U.S. Pat. Nos. 2,193,015, and 2,592,364, and JP-A-48-64933 can be used.

The developer may further comprise a pH buffer such as sulfite, carbonate, borate and phosphate of alkaline metal, a development inhibitor such as bromide, iodide and organic fog inhibitor, a fog inhibitor or the like incorporated therein. If necessary, the developer may comprise a water softener, a preservative such as hydroxylamine, an organic solvent such as benzyl alcohol and diethylene glycol, a development inhibitor such as polyethylene glycol, quaternary ammonium salt and amine, a dye-forming coupler, a competing coupler, a fogging agent such as sodium boron hydride, an auxiliary developing agent such as 1-phenyl-3-pyrazolidone, a thicknening agent, a polycarboxylic chelating agent as disclosed in U.S. Pat. No. 4,083,723, an oxidation inhibitor as disclosed in West German Patent Disclosure (OLS) 2,622,950, etc. incorporated therein.

In the color photographic processing, the photographic material which has been subjected to color development is normally subjected to bleach. Bleach may be effected at the same time with or separately of fixing. As the bleaching agent there may be used a compound of a polyvalent metal such as iron (III), cobalt (III), chromium (VI) and copper (II), peroxide, quinone, nitroso compound or the like. For example, ferricyanides, bichormates, organic complex salts of iron (III) or cobalt (III) with, e.g., organic acids such as aminopolycarboxylic acid (e.g., ethylenediaminetetraacetic acid, nitrilotriacetic acid, 1,3-diamino-2-propanoltetraacetic acid), citric acid, tartaric acid and malic acid, persulfates, permanganates, nitrosophenol, etc. can be used. Particularly useful among these bleaching agents are potassium ferricyanate, ferric sodium ethylenediaminetetraacetate, and ferric ammonium ethylenediaminetetraacetate. Ferric (III) salts of ethylenediaminetetraacetate are useful in independent bleaching bath as well as in combined bleaching and fixing bath.

The bleaching bath or blix bath may comprise a bleach accelerator as disclosed in U.S. Pat. Nos. 3,042,520, and 3,241,966, JP-B-45-8506, and JP-B-45-8836, a thiol compound as disclosed in JP-A-53-65732, and various additives incorporated therein. Further, the photographic light-sensitive material which has been subjected to bleach or blix may be then subjected to rinsing or may be merely subjected to processing in a stabilizing bath.

As the support employable in the present invention there can be used a transparent film commonly used in photographic materials such as cellulose nitrate film and polyethylene terephthalate film or reflective support.

The term "reflective support" as used herein means a support which enhances the reflectivity of a photographic material to make a dye image formed in the silver halide emulsion layer clear. Examples of such a reflective support include a support which has been coated with a hydrophobic resin having a light-reflecting substance such as titanium oxide, zinc oxide, calcium carbonate and calcium sulfate dispersed therein to enhance the reflectivity thereof in the visible light range or a hydrophobic resin having a light-reflecting substance incorporated therein. Specific examples of such a reflective support include baryta paper, polyethylene-coated paper, polypropylenic synthetic paper, and transparent support (e.g., glass plate, polyethylene terephthalate, polyester film such as cellulose triacetate and cellulose nitrate, polycarbonate film, polystyrene film, vinyl chloride resin) laminated with a reflective layer or comprising a reflective substance incorporated therein. These supports can be properly selected depending on the purpose.

Exposure for obtaining a photographic image may be effected by an ordinary method. In some detail, any of various known light sources such as natural light (sunlight), tungsten lamp, fluorescent lamp, mercury vapor lamp, Xenon arc lamp, carbon arc lamp, Xenon flash light, laser, LED and CRT may be used. The exposure time can be shorter than $1/1,000$ seconds, e.g., $1/10^4$ to $1/10^6$ seconds with a Xenon flash light, or longer than 1 second, not to mention $1/1,000$ seconds to 1 second commonly used for camera. As necessary, the spectral composition of exposing light can be adjusted by a color filter. Laser beam can be used for exposure. Further, rays emitted by a fluorescent substance excited by electron ray, X-ray, γ-ray, α-ray or the like may be used for exposure.

The present invention will be further described in the following examples, but the present invention should not be construed as being limited thereto.

EXAMPLE 1

Synthesis of Compound (III-13)

The synthesis of Compound (III-13) was effected in accordance with Scheme 1:

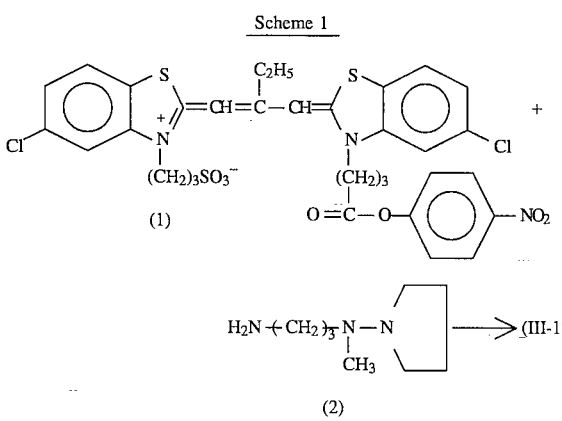

To 1.1 g (0.0015 mol) of a Compound (1), 100 ml of acetonitrile and 100 ml of chloroform was added 0.5 g (0.003 mol) of a Compound (2). The mixture was then stirred at room temperature for 3 hours. The solvent in the reaction solution was distilled off under reduced pressure. The residue was then purified by silica gel column chromatography (developing solvent: 1:4 mixture of methanol and chloroform) to obtain 0.4 g of Compound (III-13) (yield: 35%; melting point: 185°–195° C. (decomposition); $\lambda_{max}$: 560 nm; ε: 1.20×10$^5$ (methanol)).

EXAMPLE 2

Synthesis of Compound (III-14)

Compound (III-14) was prepared in the same manner as in Example 1 except that a Compound (3) represented by the following formula was used instead of the Compound (1). (Yield: 33%; melting point: 165°–175° C. (decomposition); $\lambda_{max}$: 560 nm; ε: 1.30×10$^5$ (methanol)).

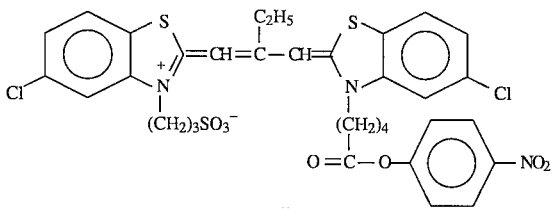

EXAMPLE 3

Synthesis of Compound (III-15)

Compound (III-15) was prepared in the same manner as in Example 1 except that a Compound (4) represented by the following formula was used instead of the Compound (1). (Yield: 46%; melting point: 165°–175° C. (decomposition); $\lambda_{max}$: 560 nm; ε: 1.15×10$^5$ (methanol)).

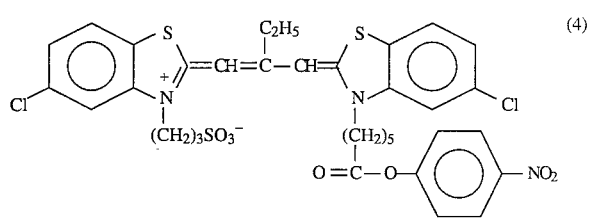

EXAMPLE 4

Synthesis of Compound (VI-1)

The synthesis of Compound (VI-1) was effected in accordance with Scheme 2:

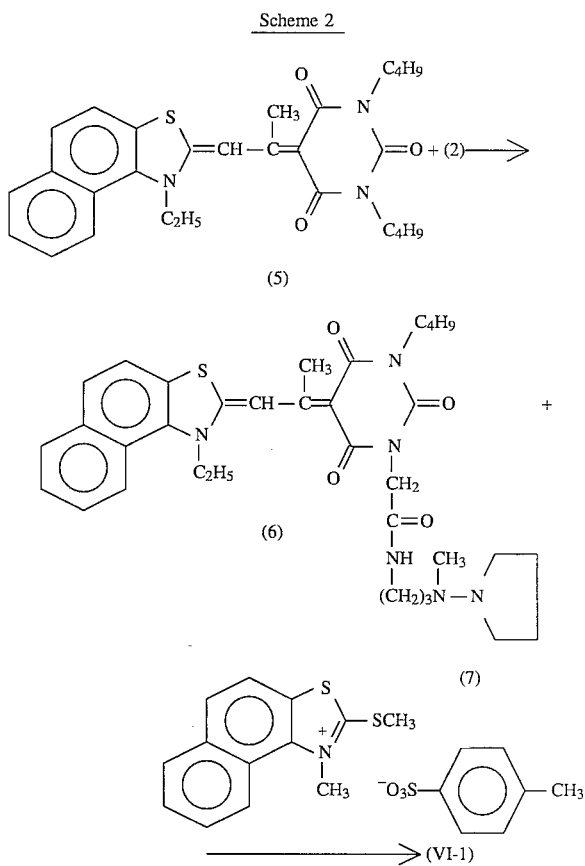

3.5 g (0.0071 mol) of a Compound (5), 1.7 g (0.0106 mol) of the Compound (2), 2.93 g (0.0142 mol) of DCC (dicyclohexylcarbodiimide), and 35 ml of pyridine were stirred at room temperature for 24 hours. To the reaction solution was then added 200 ml of acetonitrile. The resulting crystal was recovered by filtration with suction to obtain 3.7 g of Compound (6). (Yield: 82%).

To 3.5 g (0.0055 mol) of the Compound (6) thus obtained, 4.62 g (0.011 mol) of Compound (7), and 50 ml of dimethylacetamide was added 2.7 ml (0.02 mol) of triethylamine. The mixture was then stirred at an ambient temperature of 75° C. for 1 hour. To the reaction solution was then added 400 ml of ethyl acetate. The resulting crystal was then recovered by filtration with suction. The crystal thus obtained was purified by silica gel column chromatography (developing solution: 1:4 mixture of methanol and chloroform), and then recrystallized from methanol to obtain 0.7 g of Compound (VI-1). (Yield: 15%; melting point: 184°–191° C.; $\lambda_{max}$: 59.8 nm; $\epsilon$: 1.84×10$^5$ (methanol))

EXAMPLE 5

Synthesis of Compound (VI-2)

The synthesis of Compound (VI-2) was effected in accordance with Scheme 3:

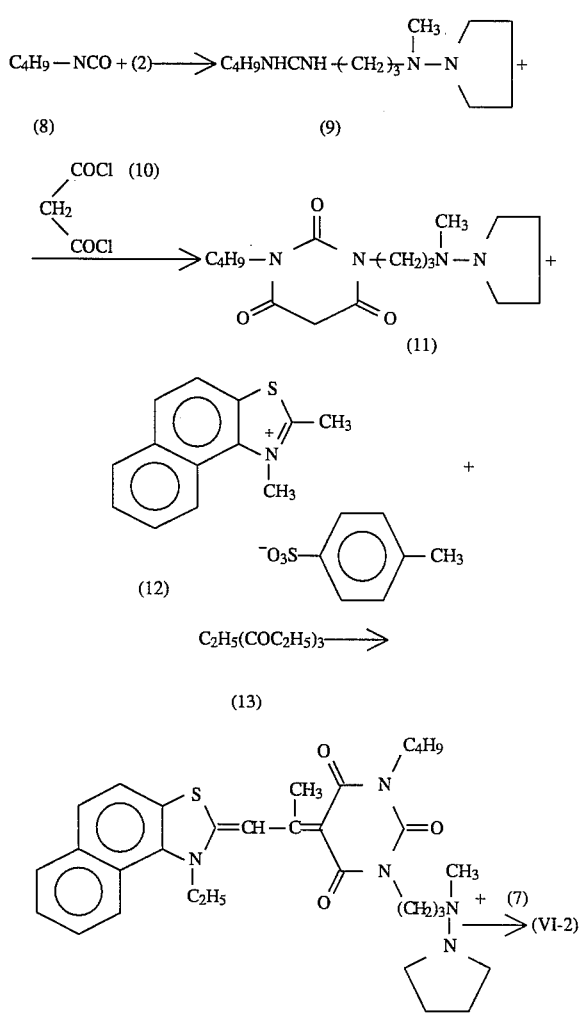

To 6 g (0.038 mol) of the Compound (2) and 20 ml of acetonitrile was added dropwise Compound (8) under cooling with ice. The mixture was then stirred at room temperature for 6 hours. The reaction solvent was then distilled off. The residue was then purified by silica gel column chromatography to obtain 8.1 g of Compound (9) in the form of liquid. (Yield: 83%)

To 6.5 g (0.025 mol) of Compound (9) thus obtained and 30 ml of acetonitrile was added dropwise a solution of 3.6 g of Compound (10) in 5 ml of acetonitrile under cooling with ice and methanol. The mixture was stirred at room temperature for 1 hour and then at an ambient temperature of 40° C. for 90 minutes. To the mixture was then added 200 ml of ice water. The mixture was then extracted with 250 ml of chloroform, and then dried. The solvent was then distilled off to obtain 6.4 g of Compound (11) in the form of liquid. (Yield: 77%)

To 4.7 g (0.012 mol) of Compound (12), 6.4 g (0.02 mol) of the Compound (11) thus obtained, 5.7 g (0.035 mol) of Compound (13), and 23 ml of isopropanol was added 3.8 ml (0.027 mol) of triethylamine. The mixture was then stirred at an ambient temperature of 60° C. for 40 minutes. The reaction solvent was then distilled off under reduced pressure. The residue was then purified by silica gel column chromatography (developing solvent: 1:6 mixture of methanol and chloroform) to obtain 1.7 g of Compound (14). (Yield: 15%)

To 1.65 g (0.0029 mol) of the Compound (14) thus obtained, 3.6 g (0.0087 mol) of Compound (7), and 14 ml of dimethylsulfoxide was added 3.3 ml (0.024 mol) of triethylamine. The mixture was stirred at an ambient temperature of 60° C. for 1 hour. To the reaction solution was then added 100 ml of ethyl acetate. The resulting crystal was then recovered by filtration with suction. The crystal thus recovered was purified by silica gel column chromatography (developing solvent: 1:6 mixture of methanol and chloroform), and then recrystallized from methanol to obtain 0.6 g of Compound (VI-2). (Yield: 27%; melting point: 271°–277° C.; $\lambda_{max}$: 600 nm; $\epsilon$: 1.97×10$^5$ (methanol))

EXAMPLE 6

Silver halide grains were formed by double jet process. The silver halide grains were subjected to physical ripening, desalting, and then chemical ripening to obtain a silver bromoiodide emulsion (iodine content: 2 mol %). The average diameter of silver halide grains contained in the emulsion was 0.7 μm. The emulsion had a silver halide content of 0.67 mol/kg. 1 kg of the emulsion was measured out in pots. The emulsion was then dissolved in a 40° C. constant temperature bath. To the emulsion specimens were then each added a methanol solution of sensitizing dyes of the present invention in a predetermined amount. The mixtures were each then stirred in the constant temperature bath.

To the emulsions each was then added 4-hydroxy-6-methyl-1,3,3a,7-tetrazaindene in an amount of 0.1 g/kg of emulsion, 2,4-dichloro-6-hydroxy-1,3,5-triazine sodium in an amount of 0.1 g/kg of emulsion, and sodium dodecylbenzenesulfonate in an amount of 0.1 g/kg of emulsion in sequence. Onto a polyethylene terephthalate film base was each then coated the emulsions in an amount such that the coated amount of silver and gelatin were 1.96 g/m$^2$ and 3.5 g/m$^2$, respectively, obtain a photographic light-sensitive material.

These specimens were each then exposed to tungsten light (5,400° K.) through a blue filter (band pass filter that transmitts light in the wavelength range of 395 nm to 440 nm) and a red filter (filter that transmitts light in the wavelength range of not shorter than 600 nm) for ¹/₁₀ seconds.

These specimens were each then developed with a developer having the following composition at a temperature of 20° C. for 4 minutes. The specimens thus developed were each dipped in a stop bath (1.5% aqueous solution of acetic acid) at a temperature of 20° C. for 30 minutes, and then subsequently subjected to fixing with Super Fuji Fix (fixing solution available from Fuji Photo Film Co., Ltd.) at a temperature of 20° C. for 2 minutes. Thereafter, these specimens were each washed with running water at a temperature of 15° C. for 15 minutes, and then dried.

These films thus processed each was measured for density by means of a densitometer produced by Fuji Photo Film Co., Ltd. to determine red filter sensitivity (SR), blue filter sensitivity (SB) and fog. The reference optical density on which sensitivity is determined was [fog+0.2].

| Developer | |
|---|---|
| Water | 700 ml |
| Methol | 3.1 g |
| Anhydrous sodium sulfite | 45 g |
| Hydroquinone | 12 g |
| Sodium carbonate monohydrate | 79 g |
| Potassium bromide | 1.9 g |
| Water to make | 1 l |

The developer was diluted with two volumes of water before use. The results are set forth as relative values in Tables 2 and 3.

Tables 2 and 3 show that the specimens comprising a compound according to the present invention singly or in combination with other dyes exhibit a high sensitivity and a low fog.

Comparative Compounds D-2, D-3 and D-6 caused an increase in the formation of fog.

The foregoing coat specimens were each allowed to stand at a relative humidity of 75% and a temperature of 50° C. for 3 days, exposed to light through a red filter under the same conditions as mentioned above, processed under the same development conditions as mentioned above, and then compared with the specimens as set forth in Tables 2 and 3 in SR and fog to determine the change in sensitivity and fog. The specimens free of compound according to the present invention set forth in Tables 2 and 3 showed a desensitization of 7 to 15% with respect to SR. On the other hand, the specimens comprising compounds according to the present invention showd a 3 to 5% reduction in desensitization.

TABLE 2

| Test No. | Compound and amount ($\times 10^{-4}$ mol/kg emulsion) | | $S_R$ | $S_R$ | Fog | Remarks |
|---|---|---|---|---|---|---|
| 1 | — | — | — | 100 (control) | 0.04 | Comparison |
| 2 | (S-1) 1 | — | 100 (control) | 65 | 0.04 | " |
| 3 | " | (D-1) 0.25 | 115 | 65 | 0.04 | " |
| 4 | " | (D-2) 0.25 | 112 | 6 | 0.15 | " |
| 5 | " | (D-3) 0.25 | 110 | 65 | 0.16 | " |
| 6 | — | (III-13) 1 | 162 | 89 | 0.04 | Present Invention |
| 7 | — | (III-4) 1 | 166 | 91 | 0.04 | " |
| 8 | — | (III-15) 1 | 162 | 89 | 0.04 | " |
| 9 | (S-1) 0.75 | (III-13) 0.25 | 166 | 91 | 0.04 | " |
| 10 | " | (III-14) 0.25 | 166 | 93 | 0.04 | " |
| 11 | " | (III-15) 0.25 | 170 | 91 | 0.04 | " |
| 12 | (S-3) 1 | — | 96 | 63 | 0.04 | Comparison |
| 13 | " | (IV-4) 1 | 151 | 87 | 0.04 | Present Invention |
| 14 | (S-4) | — | 98 | 60 | 0.04 | Comparison |
| 15 | " | (V-2) 1 | 151 | 85 | 0.04 | Present Invention |

TABLE 3
| No. | Compound and amount ($\times 10^{-4}$ mol/kg emulsion) | | $S_R$ | $S_R$ | Fog | Remarks |
|---|---|---|---|---|---|---|
| 16 | — | — | — | 100 (control) | 0.04 | Comparison |
| 17 | (S-2) 2 | — | 100 (control) | 17 | 0.04 | " |
| 18 | " | (D-5) 0.0370 | 120 | 18 | 0.04 | " |
| 19 | " | (D-6) 0.0370 | 129 | 20 | 0.10 | " |
| 20 | " | (VI-2) 0.0370 | 224 | 69 | 0.04 | Present Invention |
| 21 | " | (VI-1) 0.0370 | 229 | 68 | 0.04 | " |
| 22 | " | (VI-3) 0.0370 | 209 | 71 | 0.04 | " |
| 23 | " | (VI-7) 0.0370 | 214 | 69 | 0.04 | " |
S-1
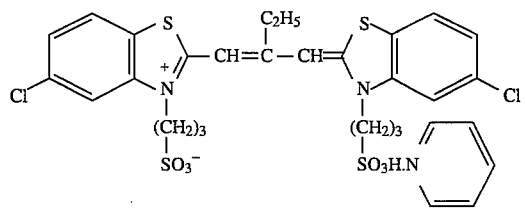
S-2
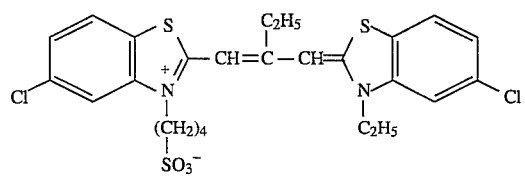
S-3
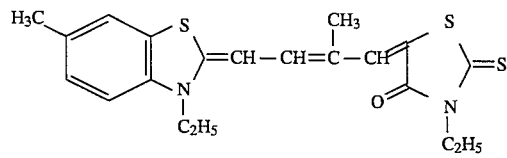
S-4
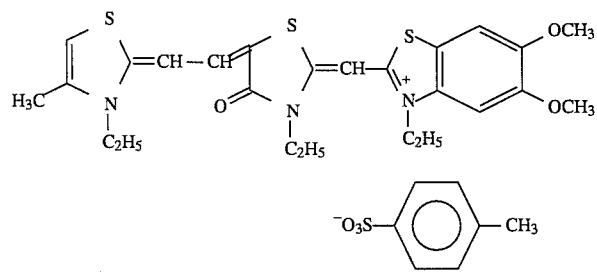
D-1
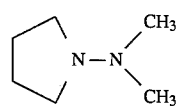
D-2

TABLE 3-continued
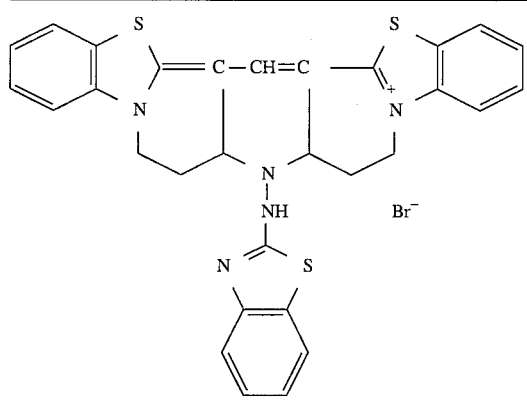
(Described in U.S. Pat. No. 3,679,427)
D-3
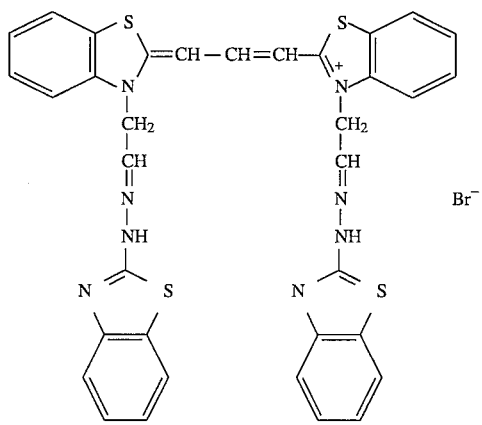
(Described in U.S. Pat. No. 3,679,427)
D-4
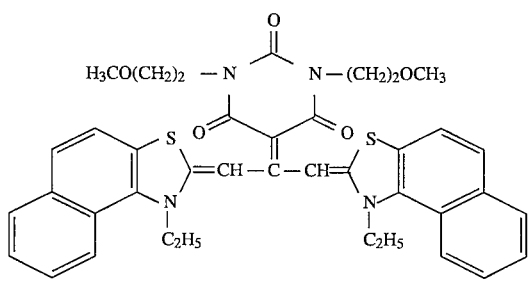
D-5
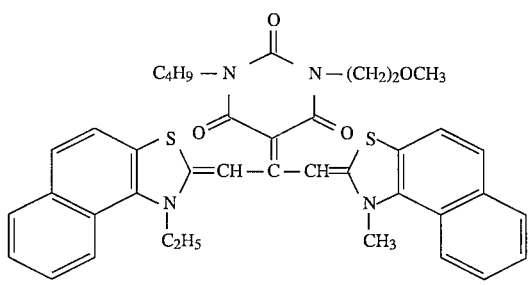
(Described in U.S. Pat. No. 4,546,074)
D-6

TABLE 3-continued

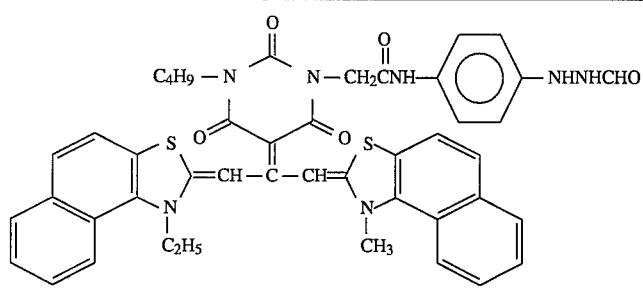

(Described in JP-A-2-67541 and JP-A-2-67542)

EXAMPLE 7

An emulsion was prepared in accordance with the following method.

25.7 g of potassium bromide, 125 g of gelatin, and a 5% aqueous solution of 3,6-dithiaoctane-1,8-diol were added to 2.5 l of water. To the mixture were then added 65 ml of a 12.77% aqueous solution of potassium bromide and 65 ml of a 17.22% aqueous solution containing 0.4 g of ammonium nitrate at a constant flow rate with vigorous stirring at a temperature of 75° C. by double jet process for 15 seconds. The mixture was then kept being stirred for 20 minutes. To the mixture were then added 1.44 l of an aqueous solution containing 246.2 g of potassium bromide, 10.5 g of potassium iodide and 1.7 g of 3,6-dithiaoctane-1,8-diol and 1.44 l of an aqueous solution containing 9.0 g of ammonium nitrate by double jet process for 90 minutes (the amount of silver nitrate added totalled 375.5 g). The mixture was then cooled to a temperature of 35° C. The mixture was then adjusted to a pH value of 4.10. To the mixture was then added the same precipitant as used in Preparation Example (1). The silver halide thus precipitated was washed with water. To the emulsion were then added 100 g of gelatin, 150 ml of a 5% aqueous solution of phenol and 1.4 l of water so that the pH and pAg values thereof were 6.8 and 8.8, respectively. The resulting silver halide grains had an average diameter of 1.78 μm and an average thickness of 0.12 μm (average diameter/thickness: 14.8). Tabular silver halide grains having a diameter of not less than 0.6 μm, a thickness of not more than 0.2 μm and a diameter/thickness ratio of not more than 10 accounted for 97.8% of all the silver halide grains as calculated in terms of projected area. The emulsion was the ripened with sodium thiosulfate hexahydrate and potassium tetraaurate at a temperature of 60° C.

Onto a polyethylene terephthalate film support was coated a gelatin dispersion of black colloidal silver as an antihalation layer in an amount of 2.0 mg/100 cm². Onto the antihalation layer were then coated various layers having the following compositions to prepare a coat specimen (3-1). 1st layer: Infrared-sensitive silver halide emulsion layer An infrared-sensitive silver bromoiodide emulsion (silver halide emulsion prepared as above) containing a sensitizing dye (S-2) in an amount of $6.0 \times 10^{-4}$ mol per mol of silver, Compound (VI-1) of the present invention in an amount of $0.15 \times 10^{-4}$ mol per mol of silver, and 4-hydroxy-6-methyl-1,3,3a,7-tetrazaindene in an amount of $1.4 \times 10^{-2}$ mol per mol of silver and a cyan-forming coupler (C-1) were coated in an amount such that the amount of silver and coupler coated were 30 mg/100 cm² and 6.8 mg/100 cm², respectively.

2nd layer: Interlayer mainly composed of gelatin

3rd layer: Green-sensitive silver halide emulsion layer

A green-sensitive silver bromoiodide emulsion (the same silver halide emulsion as used in the 1st layer) containing a sensitizing dye (Dye-1) in an amount of $5.04 \times 10^{-4}$ mol per mol of silver, and 4-hydroxy-6-methyl-1, 3,3a,7-tetrazaindene in an amount of $1.4 \times 10^{-2}$ mol per mol of silver and a magenta-forming coupler (C-2) were coated in an amount such that the amount of silver and coupler coated were 25 mg/100 cm² and 5.3 mg/100 cm², respectively. 4th layer: Yellow filter layer A gelatin dispersion of yellow colloidal silver was coated in an amount of 1.0 mg/100 cm². 5th layer: Blue-sensitive silver halide emulsion layer A blue-sensitive silver halide emulsion (the same silver halide emulsion as used in the 1st layer) containing a sensitizing dye (Dye-3) in an amount of $6.0 \times 10^{-4}$ mol per mol of silver, and 4-hydroxy-6-methyl-1, 3,3a,7-tetrazaindene in an amount of $1.4 \times 10^{-2}$ mol per mol of silver and a blue-forming coupler (C-3) were coated in an amount such that the amount of silver and coupler coated were 20 mg/100 cm² and 9.8 mg/100 cm², respectively. 6th layer: Protective layer mainly composed of gelatin The couplers to be incorporated in the 1st, 3rd and 5th layers were each emulsion-dispersed in gelatin in the form of solution in tricresyl phosphate before use. In the 2nd and 4th layers was incorporated an emulsion obtained by dissolving 2,5-di(2,4,4-trimethylpentyl-2)hydroquinone in tricresylphosphate, and then emulsion-dispersing it in gelatin as a color stain inhibitor. In the 1st to 6th layers were incorporated sodium dodecylbenzenesulfonate as a coating aid and 2,4-dichloro-6-hydroxy-1,3,5-triazine sodium as a hardener.

A coated specimen (3-2) was prepared in the same manner as Specimen (3-1) except that a sensitizing dye (VI-2) was used instead of the sensitiving dye (VI-1) to be incorporated in the red-sensitive silver halide emulsion in the 1st layer in an amount of $0.15 \times 10^{-4}$ mol per mol of silver.

A coated specimen (3-3) was prepared in the same manner as Specimen (3-1) except that a sensitizing dye (D-4) was used inplace of the sensitiving dye (VI-1) to be incorporated in the red-sensitive silver halide emulsion in the 1st layer in an amount of $0.15 \times 10^{-4}$ mol per mol of silver.

These specimens were allowed to stand at a relative humidity of 70% and a temperature of 40° C. for 14 hours, wedgewise exposed to light at a color temperature of 5,400° K. and 128 lux for 1/50 seconds, and then developed in the following manner:

| Step | Processing time | Processing temp. |
|---|---|---|
| Color development | 2 min. 00 sec. | 40° C. |
| Blix | 3 min. 00 sec. | 40° C. |
| Rinse (1) | 20 sec. | 35° C. |
| Rinse (2) | 20 sec. | 35° C. |
| Stabilization | 20 sec. | 35° C. |
| Drying | 50 sec. | 65° C. |

The various processing solutions had the following compositions:

| | (unit: g) |
|---|---|
| Color developer | |
| Diethylenetriaminepentaacetic acid | 2.0 |
| 1-Hydroxyethylidene-1,1-diphosphonic acid | 3.0 |
| Sodium sulfite | 4.0 |
| Potassium carbonate | 30.0 |
| Potassium bromide | 1.4 |
| Potassium iodide | 1.5 mg |
| Hydroxylamine sulfate | 2.4 |
| 4-[N-ethyl-N-β-hydroxyethylamino]-2-methylaniline sulfate | 4.5 |
| Water to make | 1.0 l |
| pH | 10.05 |
| Blix solution | |
| Ferric ammonium ethylenediaminetetraacetate dehydrate | 90.0 |
| Disodium ethylenediaminetetraacetate | 5.0 |
| Ammonium sulfite | 12.0 |
| 70% aqueous solution of ammonium thiosulfate | 260.0 ml |
| 98% Acetic acid | 5.0 ml |
| Bleach accelerator (H-1) | 0.01 mol |
| Water to make | 1.0 l |
| pH | 6.0 |

Rinsing solution

Tap water was passed through a mixed bed column filled with an $H^-$ type strongly acidic cation exchange resin (Amberlite IR-120B produced by Rohm & Haas) and an OH type anion exchange resin (Amberlite IR-400) so that the calcium and magnesium ion concentrations were each reduced to 3 mg/l or less. To the solution were then added 20 mg/l of dichlorinated sodium isocyanurate and 150 mg/l of sodium sulfate. A pH range of the solution was from 6.5 to 7.5.

| | (unit: g) |
|---|---|
| Stabilizing solution | |
| 37% Formalin | 2.0 ml |
| Polyoxyethylene-p-monononylphenyl ether (average polymerization degree: 10) | 0.3 |
| Disodium ethylenediaminetetraacetate | 0.05 |
| Water to make | 1.0 l |
| pH | 5.0–8.0 |

The specimens thus processed were measured for density to determine sensitivity and fog. The reference optical density on which sensitivity is determined was [fog+0.2]. The results are set forth in Table 4.

The sensitivity was represented relative to the values of the various layers (yellow, magenta, cyan-forming layers) in Specimen (3—3) as 100. The constitution of the sensitizing dye to be incorporated in the red-sensitive layer in Specimen (3—3) is disclosed in the above cited U.S. Pat. No. 4,546,074 and thus is a typical spectral sensitizing technique well known to those skilled in the art. It will be apparent that the present invention is superior to the prior art.

TABLE 4

| Sample No. | Yellow-Forming Layer | | Magenta-Forming Layer | | Cyan-Forming Layer | | |
|---|---|---|---|---|---|---|---|
| | Sensitivity | Fog | Sensitivity | Fog | Sensitivity | Fog | |
| (3-1) | 102 | 0.61 | 102 | 0.58 | 141 | 0.34 | Inv. |
| (3-2) | 100 | 0.61 | 102 | 0.58 | 135 | 0.34 | Inv. |
| (3-3) | 100 (control) | 0.61 | 100 (control) | 0.58 | 100 (control) | 0.34 | Comp. |

Sensitizing dyes used in the present example

Dye-1

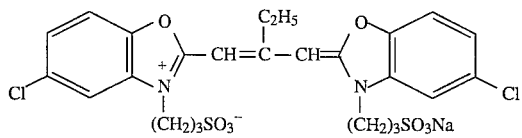

TABLE 4-continued

Dye-2

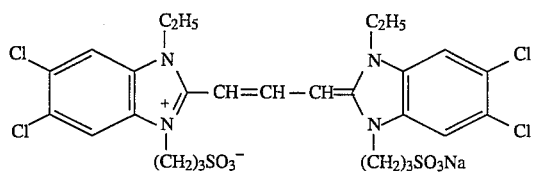

Dye-3

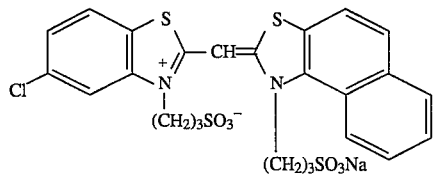

Bleach accelerator used in the present example (H-1)

Couplers used in the present invention

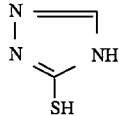

(C-1): 1-Hydroxy-N-{γ-(2,4-di-tert-amylphenoxypropyl)}-2-naphthoamide
(C-2): 1-82,4,6-Trichlorophenyl)-3-{3-(2,4-di-tert-amylphenoxyacetoamide)benzamide}-5-pyrazolone
(C-3): α-Pivaolyl-α-(2,4-dioxo-5,5'-dimethyl-3-oxazolidinyl)-2-chloro-5-{α-(2,4-di-tert-amylphenoxy)butylamide} acetanilide The compounds of the present invention, synthesis of which are exemplified in Examples 1 to 5, have an effect of providing a silver halide photographic material with a higher sensitivity and minimizing the formation of fog as shown in Examples 6 and 7.

The compounds according to the present invention are useful in the spectral sensitization of silver halide photographic materials, etc.

While the invention has been described in detail and with reference to specific embodiments thereof, it will be apparent to one skilled in the art that various changes and modifications can be made therein without departing from the spirit and scope thereof.

What is claimed is:

1. A silver halide photographic material containing at least one methine compound having a methine dye and hydrazine covalently bonded to each other, in which two nitrogen atoms are substituted by four substituents;

wherein said methine compound is represented by formula (I):

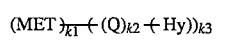  (I)

wherein MET represents an atomic group having a methine dye structure; Q represents a divalent bonding group consisting of an oxygen atom, a sulfur atom, or an atomic group containing at least one of a carbon atom, a nitrogen atom, a sulfur atom and an oxygen atom; Hy represents an atomic group having a hydrazine structure represented by formula (II); $k_1$ represents an integer 1 to 4; $k_2$ represents 0 or 1 and $k_3$ represents an integer 1 to 4;

  (II)

wherein $R_1$, $R_2$, $R_3$, and $R_4$ each represent an alkyl group, aryl group or heterocyclic group and $R_1$ and $R_2$, $R_3$ and $R_4$, $R_1$ and $R_3$, or $R_2$ and $R_4$ can bond with each other to form a ring, with the proviso that the ring may not be an aromatic ring.

2. The silver halide photographic material according to claim 1, wherein MET represents a cyanine structure represented by formula (III), (IV), (V) or (VI),

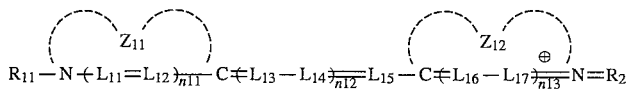 (III)

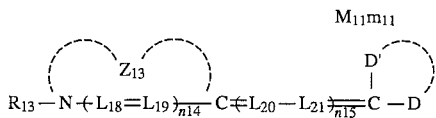 (IV)

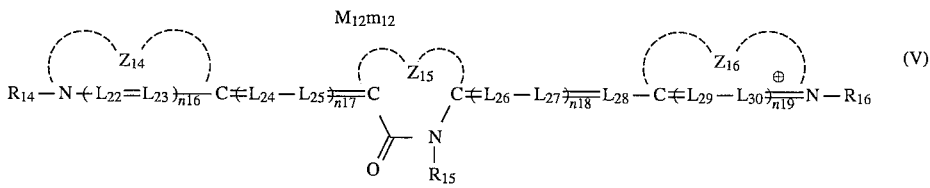 (V)

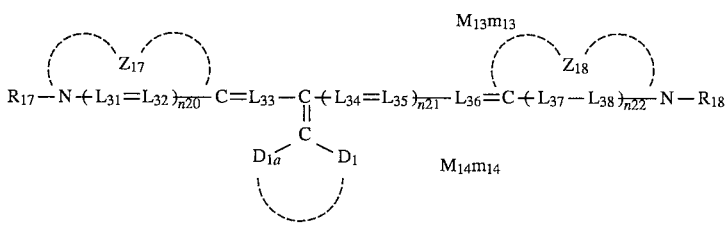 (VI)

wherein $Z_{11}$, $Z_{12}$, $Z_{13}$, $Z_{14}$, $Z_{15}$, $Z_{16}$, $Z_{17}$ and $Z_{18}$ each represents an atomic group necessary for the formation of a 5- or 6-membered nitrogen-containing heterocyclic group;

D and $D_a$, and $D_1$ and $D_{1a}$ each represents an atomic group necessary for the formation of a noncyclic or cyclic acid nucleus;

$R_{11}$, $R_{12}$, $R_{13}$, $R_{14}$, $R_{16}$, $R_{17}$ and $R_{18}$ each represents an alkyl group;

$R_{15}$ represents an alkyl group, an aryl group or a heterocyclic group;

$L_{11}$, $L_{12}$, $L_{13}$, $L_{14}$, $L_{15}$, $L_{16}$, $L_{17}$, $L_{18}$, $L_{19}$, $L_{20}$, $L_{21}$, $L_{22}$, $L_{23}$, $L_{24}$, $L_{25}$, $L_{26}$, $L_{27}$, $L_{28}$, $L_{29}$, $L_{30}$, $L_{31}$, $L_{32}$, $L_{33}$, $L_{34}$, $L_{35}$, $L_{36}$, $L_{37}$ and $L_{38}$ each represent a methine group;

$M_{11}$, $M_{12}$, $M_{13}$ and $M_{14}$ each represents a charge neutralizing paired ion, and $m_{11}$, $m_{12}$, $m_{13}$ and $m_{14}$ each represents a number of 0 or more necessary for the neutralization of electric charge in the molecule;

$n_{11}$, $n_{13}$, $n_{14}$, $n_{16}$, $n_{19}$, $n_{20}$, $n_{21}$ and $n_{22}$ each represents 0 or 1; and $n_{12}2$, $n_{15}$, $n_{17}$ and $n_{18}$ each represents 0 or a positive integer.

3. The silver halide photographic material according to claim 1, wherein Hy represents an atomic group having a hydrazine structure represented by formula (VII), (VIII), or (IX),

 (VII)

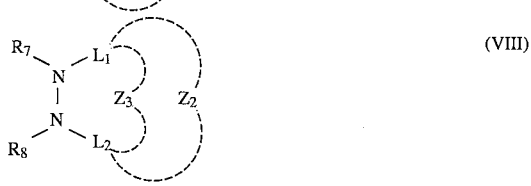 (VIII)

-continued

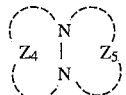 (IX)

wherein $R_5$, $R_6$, $R_7$ and $R_8$ each represents an alkyl group, an aryl group or a heterocyclic group;

$Z_1$ represents a $C_{4-6}$ alkylene group;

$Z_2$ represents a $C_2$ alkylene group;

$Z_3$ represents a $C_{1-2}$ alkylene group;

$Z_4$ and $Z_5$ each represents a $C_3$ alkylene group;

$L_1$ and $L_2$ each represents a methine group;

and in $R_5$, $R_6$, $R_7$, $R_8$, $Z_1$, $Z_4$ and $Z_5$, the carbon atom directly connected to a nitrogen atom in the hydrazine is not substituted by an oxo group.

4. The silver halide photographic material according to claim 1, wherein the divalent bonding group represented by Q consists of an oxygen atom or an atomic group which contains at least one of a carbon atom, a nitrogen atom, and an oxygen atom.

5. The silver halide photographic material according to claim 1, wherein Q represents an alkylene group, an arylene group, an alkenylene group, an amide group, an ester group, a sulfoamide group, a sulfonic ester group, an ureido group, a sulfonyl group, a sulfinyl group, a thioether group, an ether group, a carbonyl group, —N($R^1$)— in which $R^1$ represents a hydrogen atom or alkyl or aryl group or a divalent heterocyclic group having 1 to 20 carbon atoms.

6. The silver halide photographic material according to claim 5, wherein Q represents an ester group or an amide group.

7. The silver halide photographic material according to claim 1, wherein the methine compound is present in an amount of $1\times10^{-6}$ to $5\times10^{-1}$ mol per mol of silver halide.

* * * * *